(12) United States Patent
Yasukawa et al.

(10) Patent No.: US 7,583,601 B2
(45) Date of Patent: Sep. 1, 2009

(54) MULTICAST TRANSFER ROUTE SETTING METHOD, AND MULTICAST LABEL SWITCHING METHOD FOR IMPLEMENTING FORMER METHOD

(75) Inventors: Seisho Yasukawa, Tokyo (JP); Koji Sugisono, Tokyo (JP); Masanori Uga, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 878 days.

(21) Appl. No.: 10/522,713

(22) PCT Filed: Feb. 6, 2004

(86) PCT No.: PCT/JP2004/001246

§ 371 (c)(1),
(2), (4) Date: Jan. 28, 2005

(87) PCT Pub. No.: WO2004/071032

PCT Pub. Date: Aug. 19, 2004

(65) Prior Publication Data

US 2006/0147204 A1     Jul. 6, 2006

(30) Foreign Application Priority Data

Feb. 7, 2003   (JP)   ............................. 2003-031605
Feb. 17, 2003  (JP)   ............................. 2003-038782

(51) Int. Cl.
    *H04J 1/16*     (2006.01)
(52) U.S. Cl. .................. 370/238; 370/395.21; 370/516
(58) Field of Classification Search ................ 370/238, 370/254–255, 395.21, 516, 517
    See application file for complete search history.

(56) References Cited

U.S. PATENT DOCUMENTS 6,999,422 B2 *   2/2006   Ishioka ...................... 370/238
(Continued)

FOREIGN PATENT DOCUMENTS

| JP | 2001-156800 | 6/2001 |
| JP | 2002-176441 | 6/2002 |
| JP | 2002-300169 | 10/2002 |

OTHER PUBLICATIONS

Sheu et al, "A fast and effective heuristic algorithm for the delay-and delay variation bound multicast tree problem", Jan. 31, 2001, 8 pages.*

(Continued)

*Primary Examiner*—Hassan Kizou
*Assistant Examiner*—Mounir Moutaouakil
(74) *Attorney, Agent, or Firm*—Oblon, Spivak, McClelland, Maier & Neustadt, P.C.

(57) ABSTRACT

A method of establishing a multicast transfer route is disclosed that can reduce the cost of entire route under a constraint on delay incurred between starting point and ending points. The method includes the steps of: computing the shortest route with respect to delay connecting the starting point and the plural ending points based on measurement result; computing delay from a node on the shortest route to each ending point and the greatest delay; removing, if the greatest delay satisfies a delay condition, the greatest-cost route from the shortest route in accordance with selection criteria effective for cost reduction; dividing the multicast transfer route into two route trees; and establishing separately computed route as a complementary route that complement the removed route for connecting the two route trees. A method of multicast label switching for realizing the above method is also disclosed. A multicast label switching route is established using hierarchical labels by establishing a common multicast label switching route using a first layer label and establishing plural partial multicast label switching routes for subgroup destinations using lower layer labels. A relay node recognizes the hierarchical labels thereby to label-switch using all hierarchical labels.

21 Claims, 23 Drawing Sheets

——— (DELAY, COST) = (1, 1) FOR BOTH DIRECTIONS
---------- (DELAY, COST) = (1, 10) FOR RIGHT DIRECTION, AND (DELAY, COST) = (1, 1) FOR LEFT DIRECTION
– – – – (DELAY, COST) = (2, 1) FOR RIGHT DIRECTION, AND (DELAY, COST) = (1, 1) FOR LEFT DIRECTION

U.S. PATENT DOCUMENTS

2002/0071391 A1  6/2002  Ishioka
2004/0218536 A1* 11/2004 Yasukawa et al. ........... 370/238

OTHER PUBLICATIONS

Vachaspathi P. Kompella, et al., "Multicast Routing for Multimedia Communication", IEEE/ACM Transactions on Networking, vol. 1, No. 3, Jun. 1993, pp. 286-292.

Seisho Yasukawa, et al., "Extended RSVP-TE for Multicast LSP Tunnels", Internet Draft, http://www.ietf.org/internet-draft/draft-yasukawa-mpls-rsvp-multicast-01.txt, IETF, Nov. 2002, 34 pages.

Eric C. Rosen, et al., "Multicast in MPLS/BGP VPNs", Internet Draft, http://www.letf.org.internet-draft/draft-rosen-vpn-mcast-04.txt, IETF, Aug. 2002, 14 pages.

Q. Zhu et al., "A source-based algorithm for delay-constrained minimum-cost multicasting" IEEE INFOCOM' vol. 1, pp. 377 to 385, 1995.

Zhang Baoxian et al., "An efficient delay-constrained multicast routing algorithm", Proceeding of ICCT 2000, vol. 1 & II, pp. 1244 to 1247, 2000.

Yongjun Im et al., "Multicast Routing Algorithms in High Speed Networks", Proceeding of the Fifth IEEE Computer Society Workshop on Furure Trends of Distributed Computing Systems, pp. 495 to 501, Aug. 1995.

Hitoshi Uta et al., 'MPLS Jisso Ayane ni Okeru Packet Tenso Kiko no Sekkei Oyobi Jiso', Information Processing Society of Japan, Multimedia Tsushin to Busan Shori Workshop Ronbunshu, Information Processing Society of Japan Symposium Series, vol. 2000, No. 15, pp. 127 to 132, Dec. 6, 2000.

Nobuo Kohaku et al., 'Takeiro Seigyo Omogata Multicast no Sekkei to Jisso ni Kansuru Kosatsu', Information Processing Society of Japan, Multimedia Tsushin to Busan Shori Workshop Ronbunshu, Information Processing Society of Japan Symposium Series, vol. 2000, No. 15, pp. 175 to 180, Dec. 6, 2000.

* cited by examiner

ROUTE 33 IS TO BE REMOVED SINCE ITS COST IS GREATEST

COST IS REDUCED FROM 17 TO 9

MULTICAST TRANSFER ROUTE SETTING METHOD, AND MULTICAST LABEL SWITCHING METHOD FOR IMPLEMENTING FORMER METHOD

TECHNICAL FIELD

The present invention generally relates to a method of setting a multicast transfer route, an apparatus for computing a multicast transfer route, a computer program for computing a multicast transfer route, and a recording medium storing the computer program.

More particularly, the present invention relates to a method of setting multicast transfer routes in a multicast network formed by plural nodes each provided with a multicast transfer apparatus, the method comprising the step of computing multicast transfer routes connecting a given start point and plural end points by a multicast transfer route computing apparatus, and the step of setting computed multicast transfer routes by a multicast route setting apparatus. The present invention further relates to the multicast transfer route computing apparatus, a computer program that causes a computer to perform the above method, and a recording medium storing the above computer program.

The present invention yet further relates to a method of multicast label switching, and more particularly, to a method of multicast label switching that realizes efficient multicast distribution (transfer) from a multicast source node to a multicast leaf node group in a multicast communication network.

The present invention yet further relates to a method of multicast label switching applied to VPN (virtual private network) service, and more particularly, to a method of multicast label switching communication that efficiently sets an optimal multicast label switching route between PE (provider edge) routers in accordance with conditions of a VPN site accommodated in each PE router in a VPN using MPLS (multi protocol label switching).

BACKGROUND ART

Multicast communication that distributes moving image and sound to many particular users through a computer network is drawing attention. This communication method distributes information from a starting point to selected one or more ending points by copying the information at branches. If the information is distributed using a unicast communication method that communicates between the starting point and the many particular ending points on a 1-to-1 basis, as many copies of the information as the number of the particular many ending points needs to be prepared at the starting point. The use of the multicast communication reduces network traffic. According to the multicast communication, the many particular ending points are managed by a unit called a multicast group, and a transfer route is set for each multicast group. The transfer route is set in a manner in which the starting point and all ending points in the multicast group are connected. If a user desires to obtain the information distributed to a particular multicast group, the user can obtain the information by joining the multicast group. As a result, the transfer route may change in accordance with the users who participate in the multicast group.

Video conference, on-line games, motion pictures, and television are examples of applications to which the multicast communication is applicable. In the case of the video conference, delay in data transfer is an important performance. It is known that, in ordinary conversations, if voice reaches counterpart only with 100 ms delay or less, participants feel that the ordinary conversation is natural. Consequently, if the above applications are to be provided, the delay in data transfer needs to be constrained below a particular value in order to provide customers satisfactory service. There is a method of selecting a transfer route from the starting point to the ending point, wherein the transfer route satisfies a delay condition required by an application.

When a route for the multicast communication is computed, the cost of the entire route needs to be reduced in order to reduce task of network administrators and the user fee that the users of the route need to pay. Consequently, when a service such as video conference is provided, an algorithm that satisfies the delay condition and, at the same time, reduces the cost of the entire route are desired. Such algorithms for selecting a route are called "delay constrained multicast algorithms". Recently, the realization of delay constrained multicast algorithms that can provide the delay sensitive applications is drawing attention (see document No. 1 and No. 2 listed below, for example).

One of the methods currently proposed is advantageous in reducing the cost of the entire route by computing a low cost route that satisfies the delay condition. This method includes the following steps:

(1) The shortest routes connecting the starting point and the respective ending points are computed.

(2) The highest cost route that connects two of the same kind, or two different kinds, of the starting point, the ending points, and branching points, and that include none of the starting point, the ending points, and the branching points in the middle are selected and removed.

(3) As a result of removal, the selected route is divided in two route trees T1 and T2, where T1 is a partial route tree including the starting point, and T2 is a partial route tree other than T1.

(4) Route of which end points are included in the two route trees and in which the delays incurred between the starting point and the ending point satisfy a prescribed condition are computed as complementary routes for the removed route. One with the least cost is added to the route trees.

(5) One with the second highest cost of the routes selected in (2) is searched.

(6) The above steps (2)-(5) are repeated until the complementary routes for all routes are searched.

If this technique is applied to a service such as video conferencing, a transfer route that realizes a transfer delay or less can be computed (see document No. 2, for example).

The background art described above is described in the following documents:

(Document No. 1) V. Kompella et al., "Multicast routing for multimedia communication," IEEE/ACM Transactions on Networking, Volume: 1 Issue: 3, pp. 286-292, June 1993, and (Document No. 2) Q. Zhu et al., "A source-based algorithm for delay-constrained minimum-cost multicasting," proc. In IEEE INFOCOM '95, vol. 1, pp. 377-385, 1995.

However, there exists the following problems of the above technique in which the cost of the entire route is reduced by computing low cost routes that satisfy the delay condition. According to a report, the computation takes a long time.

Additionally, the above technique is based on an assumption that a link causes the same delay regardless of a direction, upstream or downstream. However, delay caused by a link in an actual network depends on the direction. To solve these problems, the related art may be extended by including the following steps.

(1) When a complementary route is added, a route from the ending point (existing in the partial tree T2) of the complementary route to an ending point existing in T2 is re-computed.

(2) Delay caused between the starting point and the ending point is computed based on the above re-computation, and a determination is made of whether the delay satisfies the delay condition. If the delay does not satisfy the delay condition, a route of the next least cost is selected, and the above step (1) is repeated.

There may be many cases in which the ending point that does not satisfy the delay condition before the extension is made does not satisfy the delay condition even after the extension is made. Since the re-computation of routes may be necessary to cope with such a situation, the computation may take a longer time.

The routes need to be set in a short time in order to provide the service quickly. However, the above technique takes a long time for the computation of routes, and consequently, may delay the beginning of the service.

On the other hand, MPLS (Multi Protocol Label Switching) can be used that sets multicast transfer routes based on the setting of routes computed by the above multicast communication route setting technique. For example, a technique is proposed for label switching transfer in which label switching routes of point-to-multipoint are set (see document No. 3, for example).

Another technique is shown in FIG. 23 that makes multicast transfer possible in a VPN using the MPLS. In the case of the technique shown in FIG. 23, PIM (Protocol Independent Multicast) instance in a VPN site and PIM instance in the provider network are distinguished. A PE router is provided with a VRF table for handling the PIM instance of each accommodated VPN site. The provider network is provided with common PIM instance (see document No. 4, for example).

The above background art is described in the following documents.

(document No. 3)

Extended RSVP-TE for Multicast LSP Tunnels, IETF (see IETF.org website).

(document No. 4)

Multicast in MPLS/BGP VPNs, IETF (see IETF.org website).

The technique that sets the multicast distribution routes using the conventional MPLS can set the label switching routes of point-to-multipoint using MPLS for the label switching transfer. However, the label switching route is a label switching route of a single layered point-to-multipoint. As a result, all input traffic label-switched by the label switching route is transferred to the same destination. That is, it is label-transferred to all reef nodes constituting the label switching route.

FIG. 24 shows the problem of the above technique. The first layer multicast LSP (Label Switched Path) is set from a provider edge router PE#1 to provider edge routers PE#2, 3, and 4. The traffic of customer edge routers CE#A1, B1, and C1 accommodated in the provider edge router PE#1 is transferred in accordance with the same topology regardless of the states of respective groups under the provider edge routers PE#2, 3, and 4. This means that the multicast traffic is transferred to unneeded points, which is not preferable. For example, there is no C1 group receiver under the provider edge router PE#2, but the traffic for the C1 group is distributed. This causes excessive use of the network resource.

As described above, the label switching using the above technique realizes the label transfer of the same transfer topology as point-to-multipoint. As a result, when traffic is intended to be multicast-distributed to a subgroup, or a subset of a leaf node group that shares the label switch LSP of the set point-to-multipoint, and constitutes the label switch LSP, the traffic is multicast-label distributed to leaf nodes other than those constituting the subgroup. The traffic cannot be partially multicast-transferred.

Furthermore, in order to realize multicast transfer on the VPN using the MPLS, PIM-SM multicast routing protocol is required to be installed in the provider network. In the case of VPN multicast technique shown in FIG. 23, the PIM instance in the VPN site and the PIM instance in the provider network are distinguished. The PE router is provided with VRF table for handling the PIM instances of respective accommodated VPN sites.

At the provider network side, PIM instance common for the provider network is provided. Multicast distribution routes are formed between the PE routers for each VPN site using a rendezvous point. Multicast routes for VPN#A and VPN#B are established in the example shown in FIG. 23. As widely known, PIM-SM (Protocol Independent Multicast Sparse Mode) is IP multicast routing protocol. The PIM-SM requires a rendezvous point for realizing multicast distribution, and since the rendezvous point becomes a single trouble point, the PIM-SM is not reliable. Additionally, in the case of the PIM-SM, although the multicast distribution route is established in the provider network, a path of which QoS (Quality of Service) is secured and a path route depending on traffic cannot be set. Thus, the PIM-SM has problems such that it cannot guarantee QoS of the network and cannot realize traffic engineering.

The PIM-SM, which requires P router (provider router) in the provider network to handle multicast state ((S, G), (*, G)), frequently changes the multicast state on the multicast route in accordance with the receiving state of multicast traffic. Since the PIM-SM requires the high speed P router of the provider core to often change its state, the use of PIM-SM is not practical.

Additionally, the PIM-SM has a problem that, because a multicast route is established for each VPN, the number of multicast connections in the provider network increases. Furthermore, because the traffic distribution pattern in the multicast connection is uncontrollable, if plural multicast traffics exist in the VPN site, unnecessary traffic is delivered to a VPN site without any receiver.

DISCLOSURE OF INVENTION

It is a general object of the present invention to provide a method of setting a multicast transfer route, an apparatus and a computer program for computing a multicast transfer route, and a recording medium storing the computer program that improves the computation speed of the multicast transfer route and reduces the cost of entire route under a constraint of delay incurred between the starting point and the ending points.

Another object of the present invention is to provide a method of multicast label switching in which the multicast distribution can be performed for each sub-leaf-group forming different subsets of leaf nodes in the multicast label switching route.

Yet another object of the present invention is to provide a method of multicast label switching in which, although common multicast route is established among provider edge routers in a virtual private network, optimum multicast distribution can be realized in accordance with traffic pattern in the virtual private network.

To achieve at least one of the above objects, according to an aspect of the present invention, a method of setting multicast transfer routes in a multicast network comprising a plurality of points, the multicast transfer routes connecting a given starting point and a plurality of ending points, the multicast network comprising a multicast transfer apparatus provided to each point, a multicast transfer route computing apparatus that computes the multicast transfer routes, and a multicast transfer route setting apparatus that sets the computed multicast transfer routes, the method includes the following steps:

the multicast transfer apparatus measures a traffic state of each direction in which data flow through each link of the network and requests the multicast transfer route computing apparatus to compute multicast transfer routes by transmitting the measured traffic state;

the multicast transfer route computing apparatus computes a shortest route with respect to delay connecting the starting point and the ending points based on the measured traffic state, computes delay from each point on the shortest route at the same time, and stores the computed delay in a recording medium;

the multicast transfer route computing apparatus computes a greatest delay in the data flow through the computed shortest route;

the multicast transfer route computing apparatus compares the greatest delay with a predefined delay condition, re-defines the delay condition if the greatest delay does not satisfy the delay condition, searches, if a condition that the shortest route satisfies is found, a partial route in the computed shortest route that has two of the same kind or different kinds of the starting point, the ending points, and branching points, as ending nodes of the partial route, that has none of the starting point, the ending points, and branching points in the middle, and that incurs the greatest cost, removes the searched partial route from the computed shortest route thereby to divide the multicast transfer route into two route trees, and sets a route computed separately as a complementary route that complements the removed route to connect the two route trees;

the multicast transfer route computing apparatus informs the multicast transfer route setting apparatus of the result of computation; and the multicast transfer route setting apparatus sets the multicast transfer route in accordance with the informed result of computation.

According to another aspect of the present invention, an apparatus for computing a multicast transfer route in a multicast network, includes:

a measurement result receiving unit that receives the result of measurement of traffic state in the multicast network;

a measurement information storing unit that stores the received result of measurement;

a measurement result storing unit that causes the measurement information storing unit to store the result of measurement; and a route computing unit that reads the result of measurement from the measurement information storing unit, and computes the multicast transfer route based on the result of measurement, wherein
the route computing unit further comprises:

a shortest route delay computing unit that computes a shortest route with respect to delay connecting the starting point and the ending points based on the measured traffic state, computes delay from each point on the shortest route at the same time, and stores the computed delay in a recording medium;

a maximum delay computing unit that computes a greatest delay in the data flow through the computed shortest route;

a maximum cost route searching unit that compares the greatest delay with a predefined delay condition, re-defines the delay condition if the greatest delay does not satisfy the delay condition, searches, if a condition that the shortest route satisfies is found, a partial route in the computed shortest route that has two of the same kind or different kinds of the starting point, the ending points, and branching points as ending nodes of the partial route, that has none of the starting point, the ending points, and branching points in the middle, and that incurs the greatest cost;

a route tree dividing unit that removes the searched partial route from the computed shortest route thereby to divide the multicast transfer route into two route trees; and a complementary route computing unit that sets a route computed separately as a complementary route that complements the removed route to connect the two route trees.

According to yet another aspect of the present invention, a computer program that causes a computer to compute a multicast transfer route based on the result of measurement of traffic state incurred in links in a multicast network, the computer program includes the steps of:

computing the shortest route with respect to delay connecting the starting point and the ending points based on the measured traffic state;

computing delay from each node on the shortest route at the same time;

storing the computed delay in a recording medium;

computing the greatest delay in data flow through the computed shortest route;

comparing the greatest delay with a predefined delay condition, re-defining, if the greatest delay does not satisfy the delay condition, the delay condition;

searching, if a condition that the shortest route satisfies is found, a partial route in the computed shortest route that has two of the same kind or different kinds of the starting node, the ending nodes, and branching nodes as ending nodes thereof, that has none of the starting node, the ending nodes, and branching nodes in the middle, and that incurs the greatest cost;

removing the searched partial route from the computed shortest route thereby to divide the multicast transfer route into two route trees;

setting a route computed separately as a complementary route that complements the removed route to connect the two route trees.

As described above, according to the present invention, because the ending point of the complementary route is fixed to the ending point of the removed route, the multicast transfer route can be created without changing the shape of partial tree of the shortest route of which root is the ending point of the removed route.

In addition, because the complementary route is selected in accordance with a selection criteria effective for cost reduction of the entire tree, the cost of route can be effectively reduced compared with the conventional multicast transfer route computing apparatus that uses the shortest route between the starting point and the ending points as the transfer routes. Furthermore, according to the present invention, the use of collecting function of the network measurement information indicating the traffic state in the existing network alone realizes the computation of transfer routes. The multicast transfer route computing apparatus can easily obtain the network measurement information. It is not necessary to develop new protocol for collecting the network measurement information required for the computation of transfer routes.

According to yet another aspect of the present invention, a method of multicast label switching in which label switching routes are established for multicast distribution from a multicast source node to a group of multicast leaf nodes, the method includes the steps of:

establishing a point-to-multipoint label switching route of a most upper layer from the multicast source node to all multicast leaf nodes;

establishing a plurality of label switching routes of a second layer that configure partial trees of a label switching route of a first layer using second layer labels for respective subgroups of leaf nodes, the subgroup of leaf nodes being extracted as destinations from the group of leaf nodes for which the point-to-multipoint label switching route has been established;

allocating traffics addressed to a destination leaf group corresponding to the second layer labels to a corresponding hierarchical label using the first layer label switching route and the second layer label switching routes by an input label edge router;

label-switching packets in accordance with a label pair of the first layer and the second layer by a relay label switch router;

if a relay node is designated as a branching node of the point-to-multipoint label switching route, replacing input label pair with output labels corresponding to a plurality of output branches and copying the input label pair for each output branch;

switching the input hierarchical label packets to an output line by an output label edge router, and identifying the group of the input hierarchical labels and removing the labels; and label-switching traffic of each second layer subgroup using point-to-multipoint LSP of the second layer forming the first layer partial tree of a plurality of second layer forming different destination subgroups of the first layer leaf group nodes in the point-to-multipoint LSP with the first layer label switching route shared.

As described above, the present invention is characterized in that, when establishing a multicast label switching route, hierarchical labels are used so that a common multicast label switching route is established using the first layer label and plural partial multicast label switching routes are established for subgroup destinations in a lower layer, and in that the relay node recognizes the hierarchical labels and the label switching is performed using the entire hierarchical labels. The conventional technique is different from the present invention in that, even if hierarchical label method is used for multicast transfer, packets are multicast-transferred to all leafs with the same topology, and in that, even if the hierarchical label is provided, only the first layer label is used for label switching and the labels lower than the second layer are simply copied at the branching point without being converted.

The present invention is characterized with respect to the VPN multicast in that: the first layer label is used for label switching of common point-to-multipoint label switch path for connecting PE routers in the same manner as the architecture of RFC2547bis; the second layer label is used for label switching for VPN sites accommodated in PE routers; and the third layer label is used for discriminating traffic class in the VPN sites. The present invention is different from the conventional technique in that: the multicast transfer route is established efficiently in the provider network by using common multicast label switching path; and because multicast transfer can be performed in the optimum transfer route in accordance with the traffic condition in the VPN sites via the established multicast distribution route, the network can be efficiently operated without generating unnecessary multicast copy traffic in the provider network.

As described above, according to the present invention, the optimum common multicast communication route can be established in accordance with destination groups of respective multicast traffics and QoS requirements. Furthermore, since the bandwidth of the entire network can be efficiently used, a multicast distribution network and VPN network of high performance can be built.

Other objects, features and advantages of the present invention will become more apparent from the following detailed description when read in conjunction with the accompanying drawings.

BEST MODE FOR CARRYING OUT THE INVENTION

Figure 1:
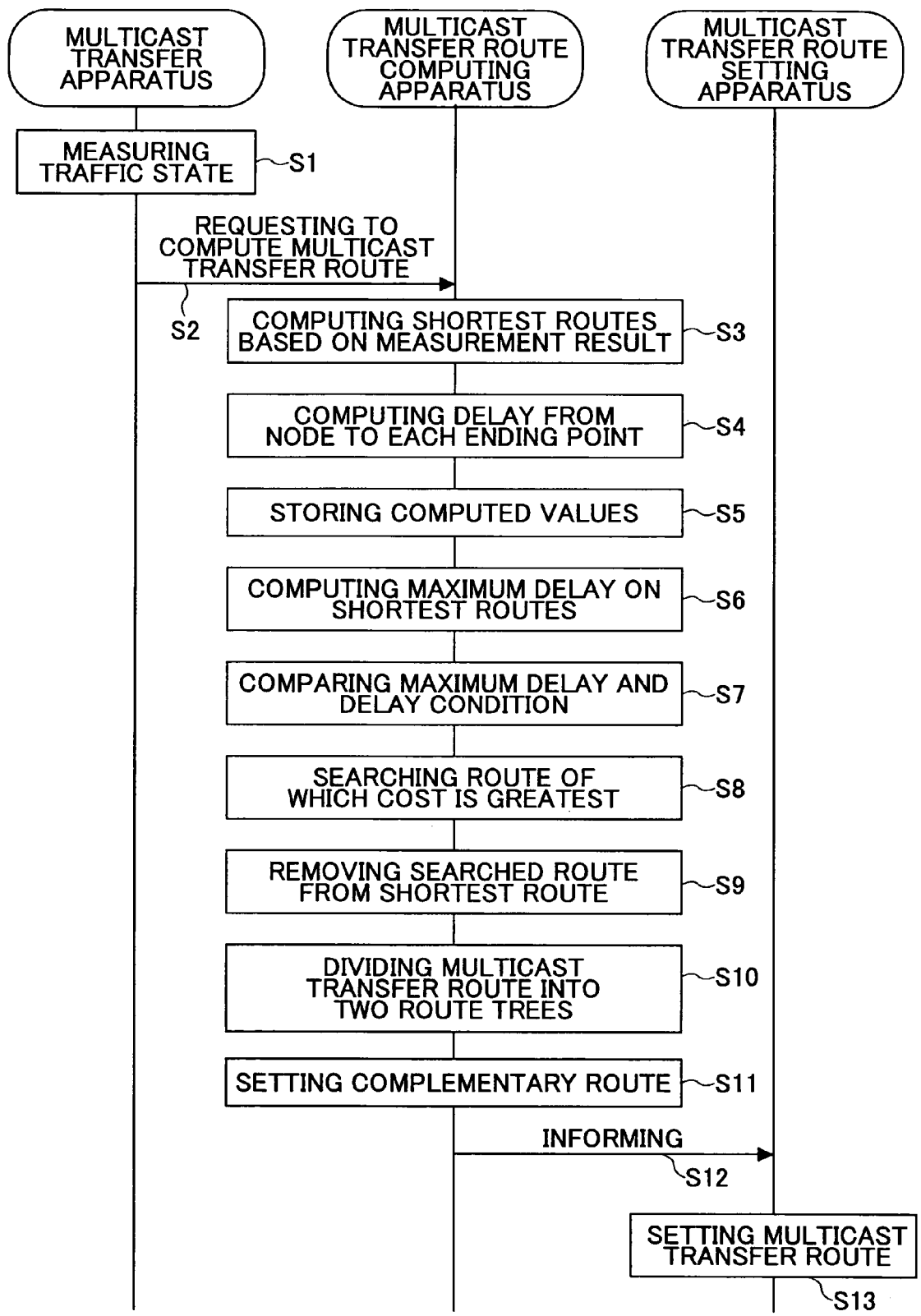
FIG. 1 is a sequence diagram for explaining the principle of the present invention.

FIG. 1 is a sequence diagram for explaining the principle of the present invention.

The present invention includes a method of setting multicast transfer routes for a multicast network including plural nodes each provided with a multicast transfer apparatus, the method including the step of computing multicast transfer routes connecting a given starting point and plural ending points using a multicast transfer route computing apparatus, and the step of setting the computed multicast transfer routes by a multicast route setting apparatus. Each step shown in FIG. 1 is described below.

The multicast transfer apparatus measures the traffic state of each link in the multicast network, and of each direction in which data flow through the link (step 1). The multicast transfer apparatus requests the multicast transfer route computing apparatus to compute multicast transfer routes by transmitting the result of the traffic state measurement thereto (step 2).

The multicast transfer route computing apparatus computes the shortest route connecting the starting point and the plural ending points based on the result of measurement obtained from the request (step 3) by the multicast transfer apparatus. The multicast transfer route computing apparatus computes delay from nodes in the shortest route to the respective ending points (step 4), and stores the computed value in a recording medium (step 5). Then, the multicast transfer route computing apparatus computes the maximum delay of data flowing through the computed shortest route (step 6), and compares the computed maximum delay with a predefined delay condition (step 7). If the computed maximum delay does not satisfy the delay condition, the delay condition is set again. If it is found that the delay condition matches the computed maximum delay of the shortest route, a route of which cost between two nodes at both ends is greatest is searched from all partial routes in the computed shortest route (step 8). A partial route has the same kind, or different kinds, of the starting point, the ending point, and branching points as both ends, but includes none of the above points in the middle.

The multicast transfer route computing apparatus removes the searched route from the shortest route (step 9), and divides the multicast transfer route into two route trees (step 10). The multicast transfer route computing apparatus sets a route computed separately as a complementary route to the removed route in order to connect the two route trees (step 11), and informs the multicast transfer route setting apparatus of the result of computation (step 12).

The multicast transfer route setting apparatus sets the multicast transfer route in accordance with the received result of computation (step 13).

Figure 2:
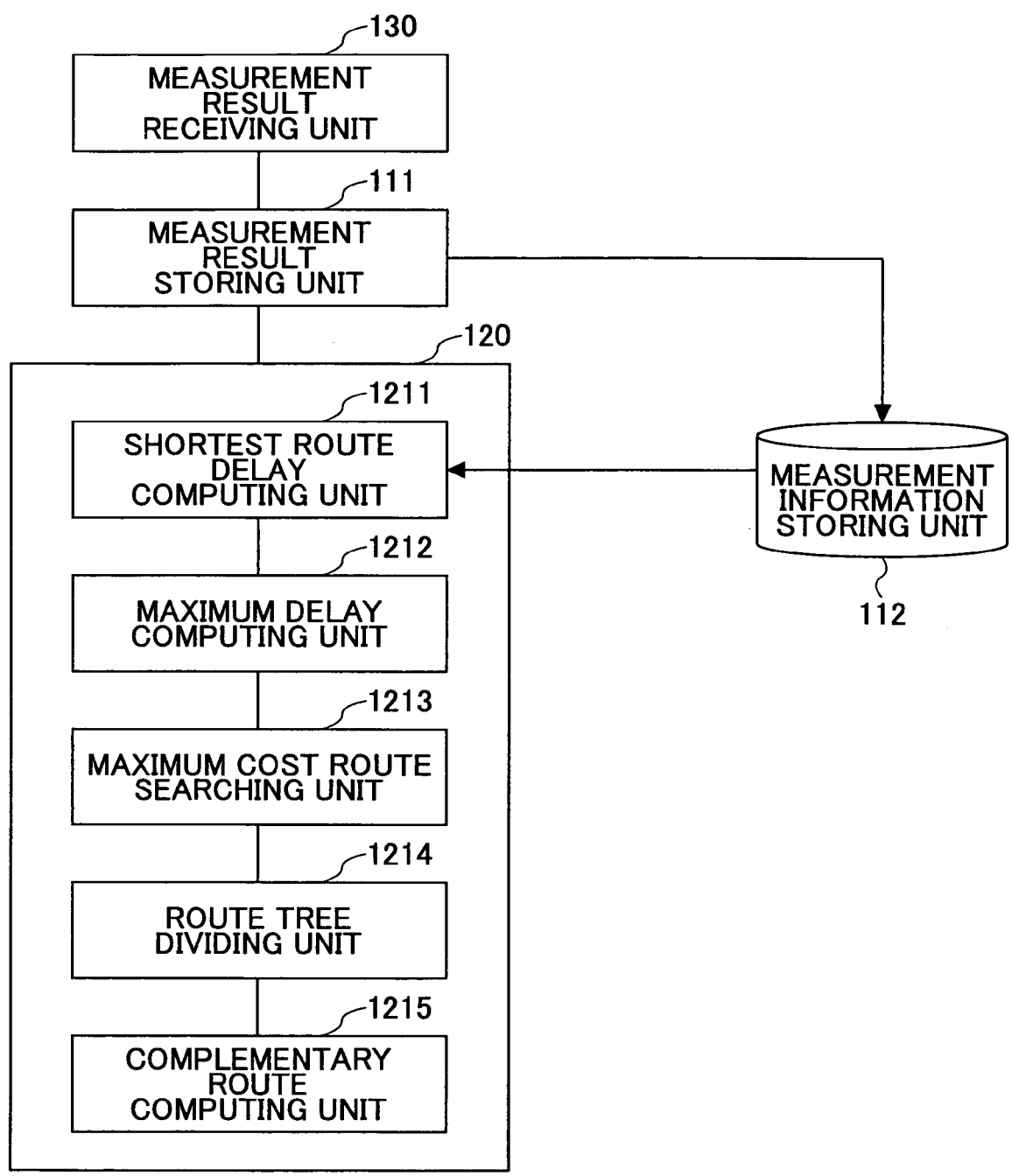
FIG. 2 is a schematic diagram for explaining the principle of a multicast transfer route computing apparatus according to an embodiment.

FIG. 2 is a schematic diagram showing the principle of the present invention. The multicast transfer route computing apparatus according to the present invention is provided with the following units: a measurement result receiving unit 130 that receives the result of measurement of traffic state in the multicast network; a measurement information storing unit 112 that stores the received result of measurement; a measurement result storing unit 111 that stores the result of measurement in the measurement information storing unit 112; and a route computing unit 120 that reads the result of measurement from the measurement information storing unit 112, and computes routes based on the result of measurement.

The route computing unit 120 is further provided with the following units: a shortest route delay computing unit 1211 that computes the shortest routes connecting the starting point and plural ending points, computing at the same time delay from any node on the route to each ending point, and stores the computed value in a recording medium 122; a maximum delay computing unit 1212 that computes the maximum delay of data flowing through the computed shortest route; a maximum cost route searching unit 1213 that compares the maximum delay with a predefined delay condition, sets again the delay condition if the maximum delay does not match the delay condition, and searches a route of which cost between two node on both ends is greatest from all partial routes that include as end points two of the same kind, or different kinds, of the starting point, the ending points, and branching points, and that include none of the above points in the middle; a route tree dividing unit 1214 that removes the searched route from the shortest route and divides the multicast transfer route into two route trees; and a complementary route computing unit 1215 that sets a route computed separately as a complementary route of the removed route in order to connect the two route trees.

The preferred embodiments of the present invention are described below with reference to the drawings.

Figure 3:
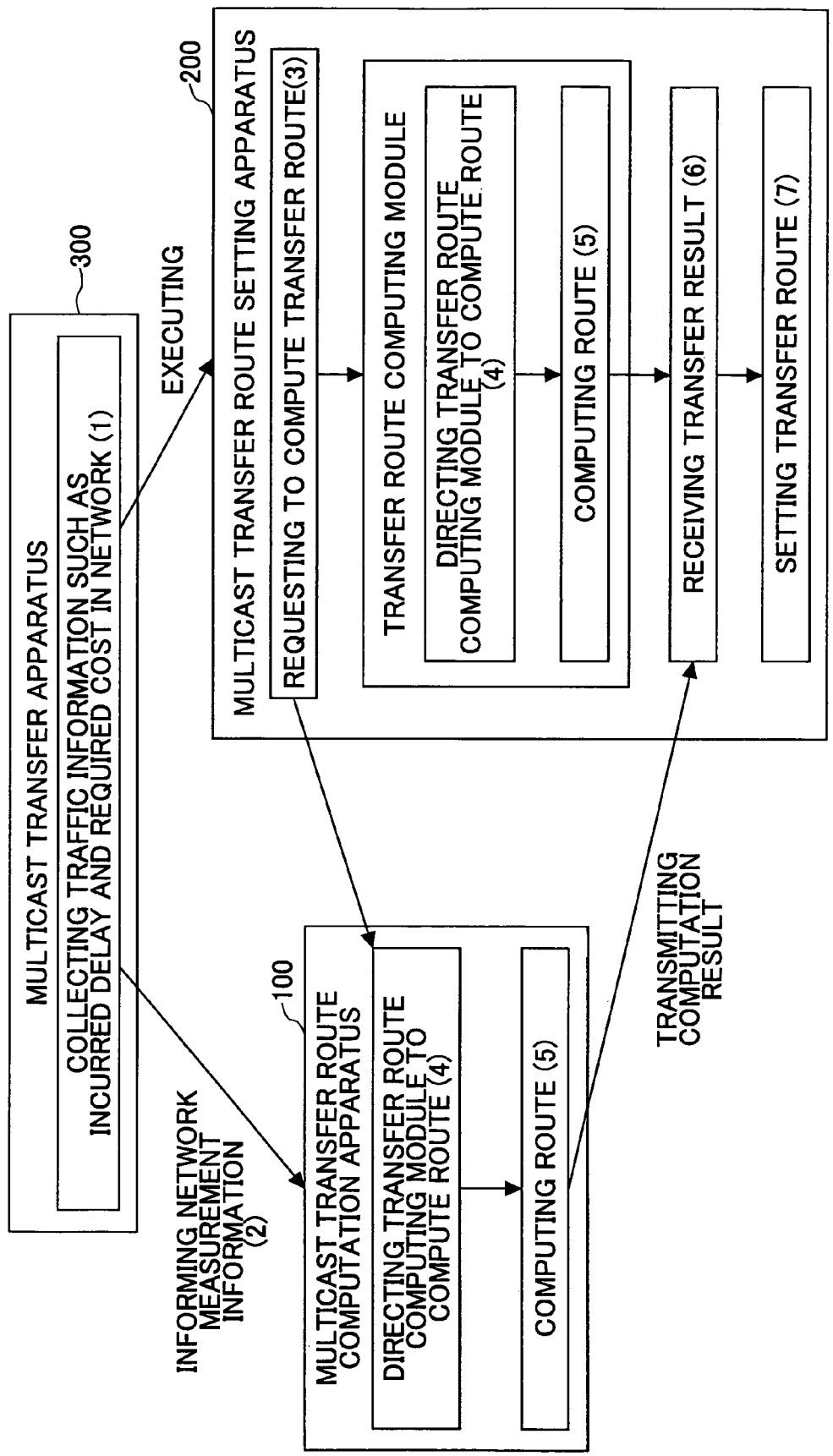
FIG. 3 is a schematic diagram for explaining a method of setting a multicast transfer route according to an embodiment.

FIG. 3 is a schematic diagram for explaining the outline of an embodiment of the present invention. The numerals in parenthesis in the drawings correspond to those in the following description.

The present invention relates to a method of setting multicast transfer routes in a multicast network in the case in which there is an upper limit of delay caused from the starting point to the ending point. The multicast network includes plural nodes each provided with a multicast transfer apparatus 300, and the multicast transfer route computing apparatus 100 and the multicast transfer route setting apparatus 200 are provided at one of the nodes.

The multicast transfer apparatus 300 collects network measurement information indicating delay in data transfer, for example, caused by each link in both direction of data flow (1), and informs the multicast transfer route computing apparatus 100 and the multicast transfer route setting apparatus 200 of the network measurement information (2). Then, when a multicast data transfer route needs to be set, the multicast transfer route setting apparatus 200 and the multicast transfer route computing apparatus 100 set the transfer route in accordance with processing to be described below.

According to the present invention, the multicast transfer apparatus 300 collects network measurement information of data transferred between nodes. The multicast transfer route computing apparatus 100 computes transfer routes. The multicast transfer route setting apparatus 200 sets transfer routes. One of the nodes may function as one of the above apparatuses.

If the multicast transfer route setting apparatus 200 and the multicast transfer route computing apparatus 100 are provided to different nodes, then the multicast transfer route setting apparatus 200 requests the multicast transfer route computing apparatus 100 to compute the transfer routes (3). The multicast transfer route computing apparatus 100 directs its own route computing module to compute the routes (4). If the multicast transfer route setting apparatus 200 and the multicast transfer route computing apparatus 100 are provided to the same node, the multicast transfer route setting apparatus 200 directs its own route computing module to compute routes (4). The transfer route computing module of the multicast transfer route setting apparatus 200 or the multicast transfer route computing apparatus 100 computes the transfer routes based on the collected information (5). The route setting module of the multicast transfer route setting apparatus 200 is notified of the computation result (6) and sets the multicast transfer routes in response to receipt of the computation result. The network measurement information is collected using extended route computation protocol with which adjacent nodes can exchange the network measurement information. The route computation protocol is Open Shortest Path First-Traffic Engineering (OSPF-TE) and Intermediate System-Intermediate System-Traffic Engineering (IS-IS-TE), for example.

The multicast transfer route computing apparatus 100 is provided with the following: function to receive the network measurement information from the multicast transfer apparatus 300; packet transfer function to transmit the computation result of the transfer routes; computer programs to realize the algorithm of route computation; a recording medium to store the network measurement information, route computation program, and the result of route computation; and function to compute routes.

The route computation program according to the present invention is provided with the following: function to compute the shortest route from the starting point to the ending points; function to compute the shortest delay from a point of which length is computed in the step of computing the shortest route to the ending point; function to search a route of which cost is the greatest from continuous routes of which both ends are either the starting point, the ending point, or branching points, and that includes none of the above points in the middle; and function to remove the searched route and to select a complementary route, the ending point of which is the ending point of the removed route and the starting point of which is a node included in the shortest partial tree including the starting point of the removed route, and the cost of which is the least.

According to the above functions, the ending point of the complementary route is fixed to the ending point of the removed route. Accordingly, the present invention can create the multicast transfer route without changing the shape of partial tree of which root is the ending point of the removed route.

According to the present invention, the complementary route is selected in accordance with selection criteria that is effective for reducing the cost of the entire tree. The cost of route can be effectively reduced in comparison with that of a multicast transfer route computing apparatus that uses the shortest route between the starting point and the ending point as the transfer route. Additionally, according to the present invention, the transfer route can be readily computed by using only function to collect the network measurement information indicating the traffic state in an existing network. The multicast transfer route computing apparatus 100 can easily obtain the network measurement information. Advantageously, according to the present invention, new protocol does not need to be developed that collect the network measurement information required for the computation of the transfer route.

The multicast transfer route computing apparatus 100 and the multicast transfer route setting apparatus 200 that are necessary for realizing the method of setting multicast transfer route according to the present invention are described below.

Figure 4:
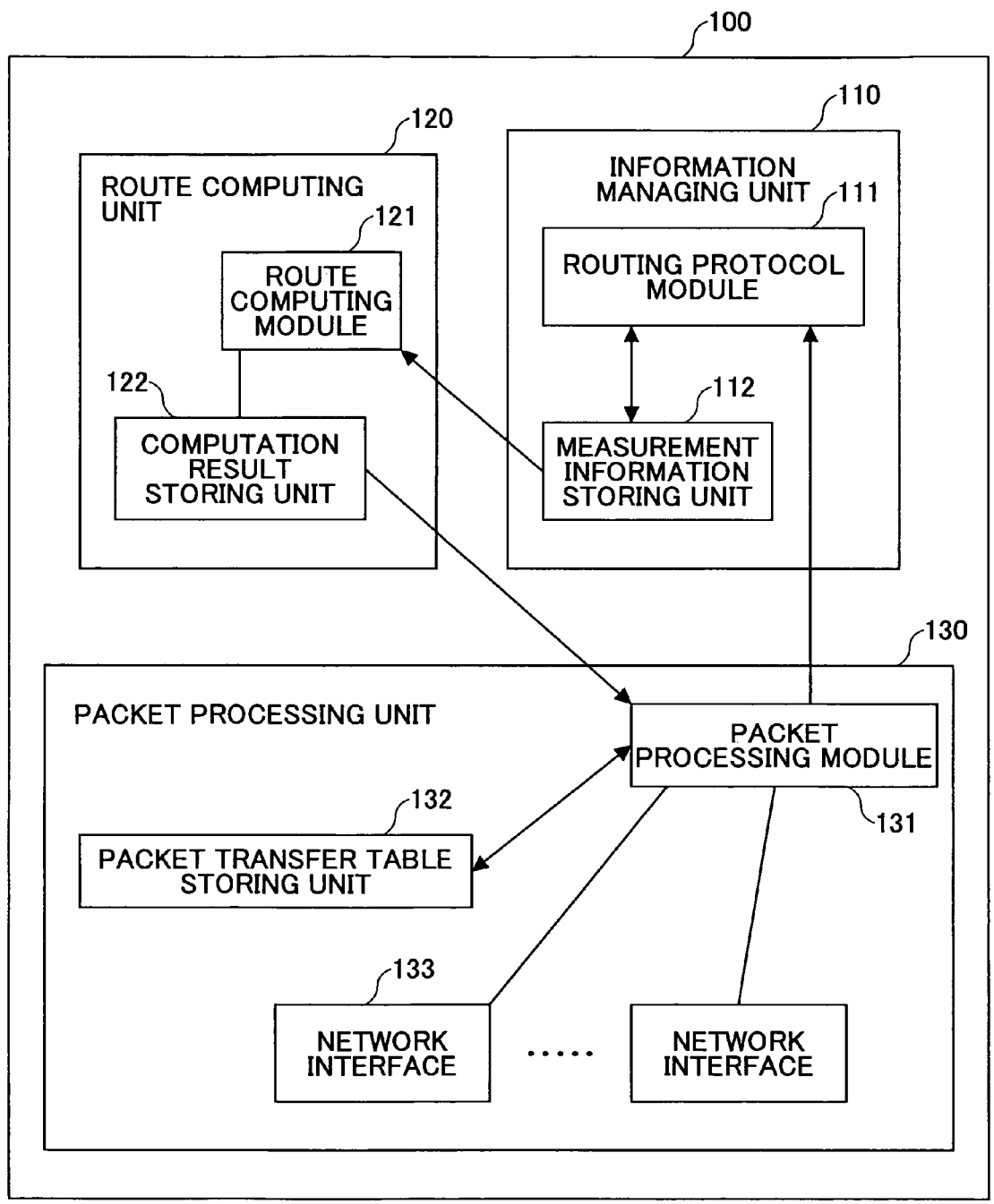
FIG. 4 is a schematic diagram showing the structure of the multicast transfer route computing apparatus according to an embodiment.

FIG. 4 is a schematic diagram showing the structure of the multicast transfer route computing apparatus 100 according to an embodiment. The multicast transfer route computing apparatus 100 shown in FIG. 4 is provided with the following: an information managing unit 110 that manages the network measurement information related to delay and cost caused by the node and links connecting the nodes in the network; a route computing unit 120 that computes the transfer routes; and a packet processing unit 130 that processes packets to be transmitted and received. The packet processing unit 130 of the multicast transfer route computing apparatus 100 receives the network measurement information managed by the information managing unit 110 and the request for computing the route, and transmits the computation result of the transfer route computed by the route computing unit 120 to the multicast transfer route setting apparatus 200.

The information managing unit 110 is provided with a routing protocol module 111 that processes protocols and a measurement information storing unit 112 that manages the network measurement information such as network topology, delay, and cost measured by the protocol.

The route computing unit 120 is provided with a route computing module 121 that computes the transfer route, and a computation result storing unit 122 that stores the computation result.

The packet processing unit 130 is provided with the following: a packet processing module 131 that determines the kind of received packet and transfers, or transmits, to the information managing unit 110, the received packet; a packet transfer table storing unit 132 that stores the destinations of packets; and one or more network interfaces 133.

Figure 5:
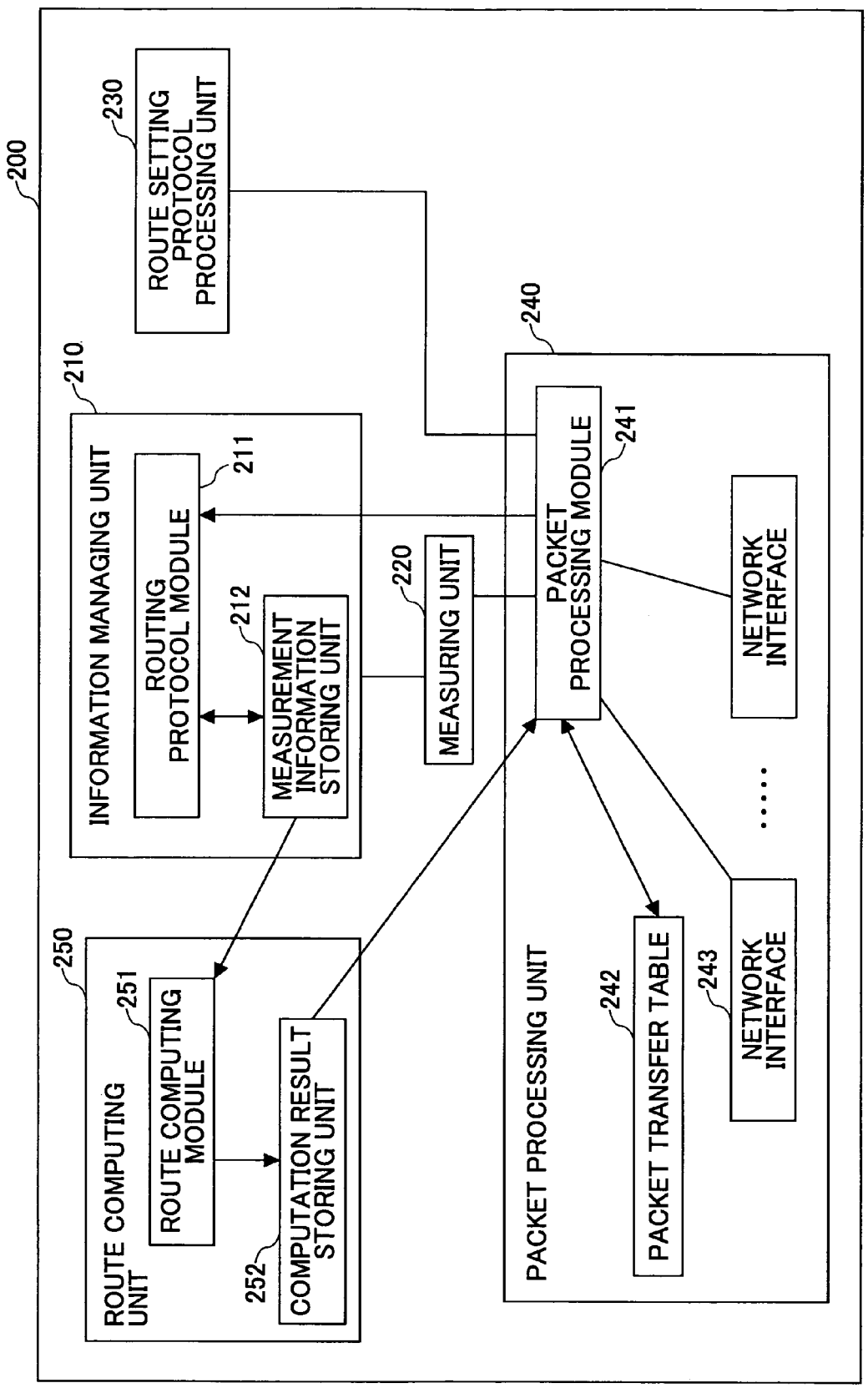
FIG. 5 is a schematic diagram showing the structure of a multicast transfer route setting apparatus according to an embodiment.

FIG. 5 is a schematic diagram showing the structure of the multicast transfer route setting unit 200 according to an embodiment.

As shown in FIG. 5, the multicast transfer route setting unit 200 is provided with the following: an information managing unit 210 that manages information related to the delay and cost caused by the nodes and links in the network; a measuring unit 220 that measures delay and cost caused by the multicast transfer route setting apparatus 200; a route setting protocol processing unit 230 that sets the route when a new data flow is generated; a packet processing unit 240 that processes received packets.

The basic structure of the information managing unit 210 is similar to the information managing unit 110 of the multicast transfer route computing apparatus 100. The information managing unit 210 is provided with a routing protocol module 211 and a measurement information storing unit 212.

The measuring unit 220 is provided with a measurement module that measures information such as the state of network interfaces 243 (to be described below) provided in the packet processing unit 240 and delay in processing by each node of the network.

The packet processing unit 240 is provided with the following: a packet processing module 241 that determines the kind of received packets, transfers the packets, and determines the setting of new routes; a packet transfer table storing unit 242 that stores the destination to which the packets are transferred, and network interfaces 243.

The multicast transfer route setting apparatus 200 is provided with a route computing unit 250, which includes a computation processing module 251 that computes transfer routes and a computation result storing unit 252 that stores the computation result. If the multicast transfer route setting apparatus 200 computes the transfer routes, then the route computing unit 250 operates in the same manner as the multicast transfer route computing apparatus 100.

The route setting protocol processing unit 230 receives a request from the packet processing unit 240 for setting a route, and transmits the request for setting a route to the multicast transfer route computing apparatus 100. The route setting protocol processing unit 230 sets a transfer route for data transfer in accordance with the computation result of the transfer route received from the multicast transfer route computing apparatus 100.

If the multicast transfer route computing apparatus 100 and the multicast transfer route setting apparatus 200 are provided at the same node, the node has the above units provided to the multicast transfer route computing apparatus 100 and the multicast transfer route setting apparatus 200, and performs the above steps. If the multicast transfer apparatus 300 is provided to the same node, the route setting protocol processing unit 230 requests an adjacent node to compute the route.

The operation of the multicast transfer route computing apparatus 100, the multicast transfer route setting apparatus 200, and the multicast transfer apparatus 300 is described below.

The nodes that function as multicast transfer apparatuses 300 always exchange the network measurement information indicating the network topology, delay, and cost. Each node stores the network measurement information obtained by the exchange.

The network measurement information exchanged by the nodes includes not only the network measurement information measured by an adjacent node but also the stored network measurement information measured by other nodes. Each node retains the network measurement information such as the network topology and delay of all nodes in the network by exchanging the network measurement information. When setting a new transfer route, a node that functions as the multicast transfer route setting apparatus 200 requests another node that functions as the multicast transfer route computing apparatus 100 to compute the transfer routes. In response to receipt of the request, the node that functions as the multicast transfer route computing apparatus 100 computes the transfer route based on the network measurement information related to the traffic in the network such as the topology and the delay managed by the information managing unit 110 and on information about the ending points received from the requesting node.

Figure 6:
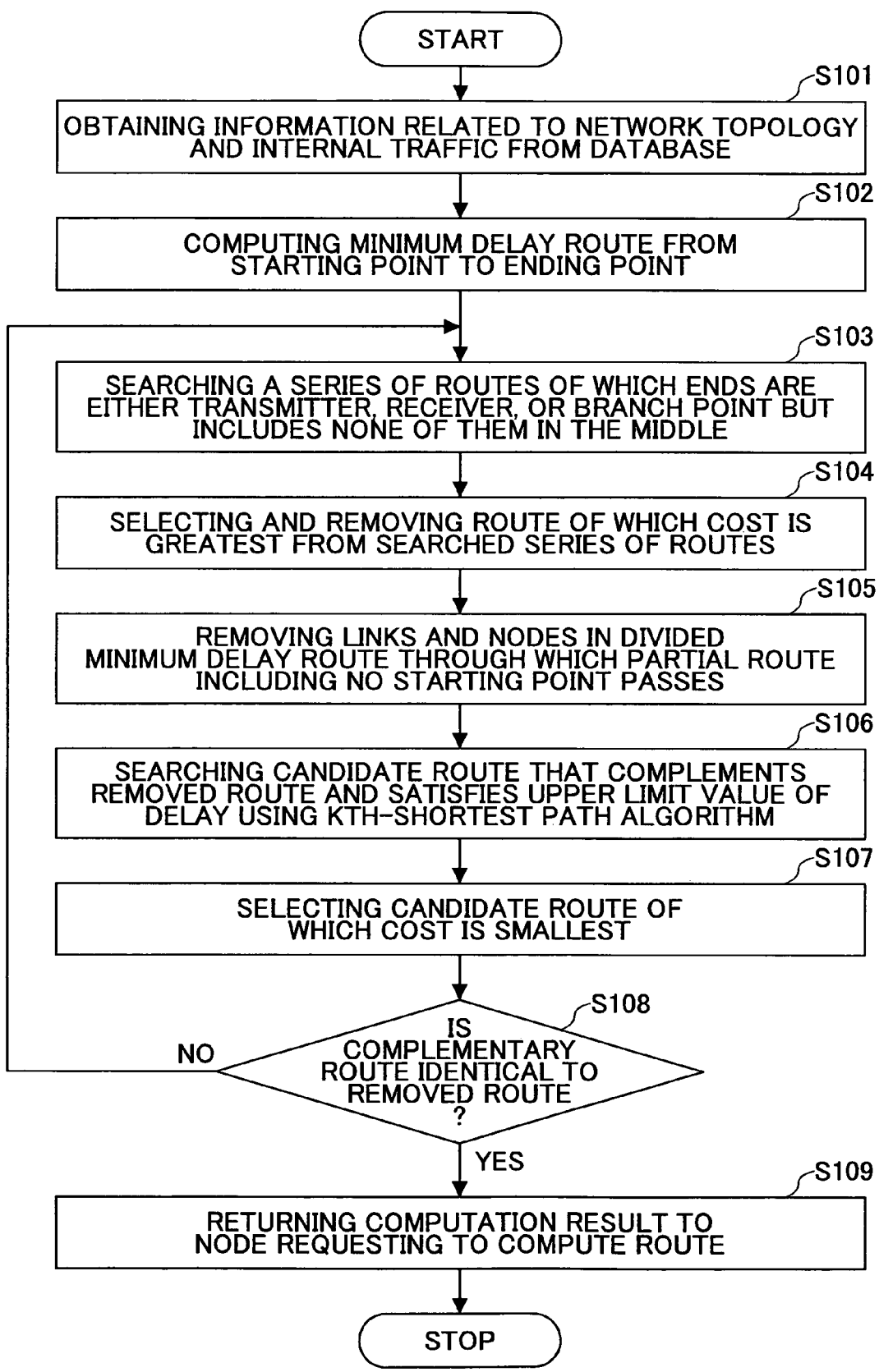
FIG. 6 is a flow diagram showing an algorithm for computing a transfer route according to an embodiment.

FIG. 6 is a flowchart showing an algorithm of computing transfer routes according to an embodiment.

The multicast transfer route computing apparatus 100 receives a request for computing a route from a node having a function of the multicast transfer route setting apparatus 200. The multicast transfer route computing apparatus 100 also receives information related to the ending points of the data transfer from the multicast transfer route setting apparatus 200. The route computing unit 120 of the multicast transfer route computing apparatus 100 reads the network measurement information indicating the network topology and the traffic state stored in the measurement information storing unit 112 (database) of the information managing unit 110 (step 101).

The route computing module 121 computes a route (least delay route) that causes the least delay from the starting point to the ending point using the network measurement information (step 102). The route computing module 121 computes the least delay route from the node that has transmitted the request to the ending node. The Dijkstra's algorithm can be used for the computation of the least delay route. According to the above arrangement, the least delay route from the node that has transmitted the request to the ending points can be computed.

Next, the route computing module 121 of the multicast transfer route computing apparatus 100 searches partial routes starting and ending with one of the starting point, the ending points, and branching points, and at the same time not including any one of the above points in the middle, the partial routes included in the least delay routes computed in step 102 (step 103).

The partial route of which cost is the greatest is selected from the computed partial routes, and it is removed from the least delay route described above. Information about the ending points of the removed partial route is stored in the computation result storing unit (step 104). As a result, the least delay route is divided into two partial routes. Next, the route computing module 121 of the multicast transfer route computing apparatus 100 adds the following to the network topology stored in the measurement information storing unit 112 of the information management unit 110: a pseudo starting point, and links connecting the pseudo starting point and respective ones of all nodes included in the remaining partial route including the starting point. Subsequently, the following are removed from the network topology: links and nodes through which the remaining partial route not including the starting point, and links connected to the nodes. However, the following are not removed from the network topology: the node that becomes the starting point of the partial route to be removed, and the links connecting the node and other nodes that do not constitute the partial route. (step 105)

Subsequently, a route connecting the pseudo starting point and a starting point of the remaining partial route that does not include the starting point of the least delay route is searched. For the search of the route, an algorithm called "k-th shortest path algorithm" may be used that computes a route of which delay is the k-th least. This type of algorithm searches a route with the "k−1"-th least delay, and then searches a route with the "k"-th least delay. It is possible to set an upper limit to the delay and to perform this algorithm until all routes with lower delay are found. The searched routes become candidates of a complementary route that complement the removed route (step 106).

The route computing module 121 of the multicast transfer route computing apparatus 100 computes the total cost of the routes searched by the k-th shortest path algorithm, and selects the route with the least cost. The selected route becomes the complementary route that complements the removed route (step 107).

Finally, the route computing module 121 of the multicast transfer route computing apparatus 100 determines whether the route to be removed and the selected complementary route are the same. If they are the same route, the route computing module 121 searches a route with the next least cost, and repeats the above step until the complementary route becomes the searched route (step 108).

The route computing module 121 returns the result of computation to the requesting node that has requested to compute the route (step 109).

According to the present embodiment, the multicast transfer apparatus 300 may use OSPF-TE for collecting the network measurement information such as delay. The OSPF-TE is a communication protocol in which the traffic information of the network such as delay is stored in the topology information exchange information of OSPF, or the routing protocol of unicast.

According to the present embodiment, multicast MPLS (Multi Protocol Label Switching) protocol, which is extended RSVP-TE (Resource Reservation Protocol-Traffic Engineering) that explicitly designates routes, is used as data transfer setting protocol. The multicast MPLS is different from the RSVP-TE used in an ordinary MPLS in that an information element in which a tree topology can be stored is added to a message for generating LSP (Label Switched Path), and Point-to-Multipoint LSP can be established.

Preferred embodiments of the present invention are further described with reference to the drawings.

Figure 7:
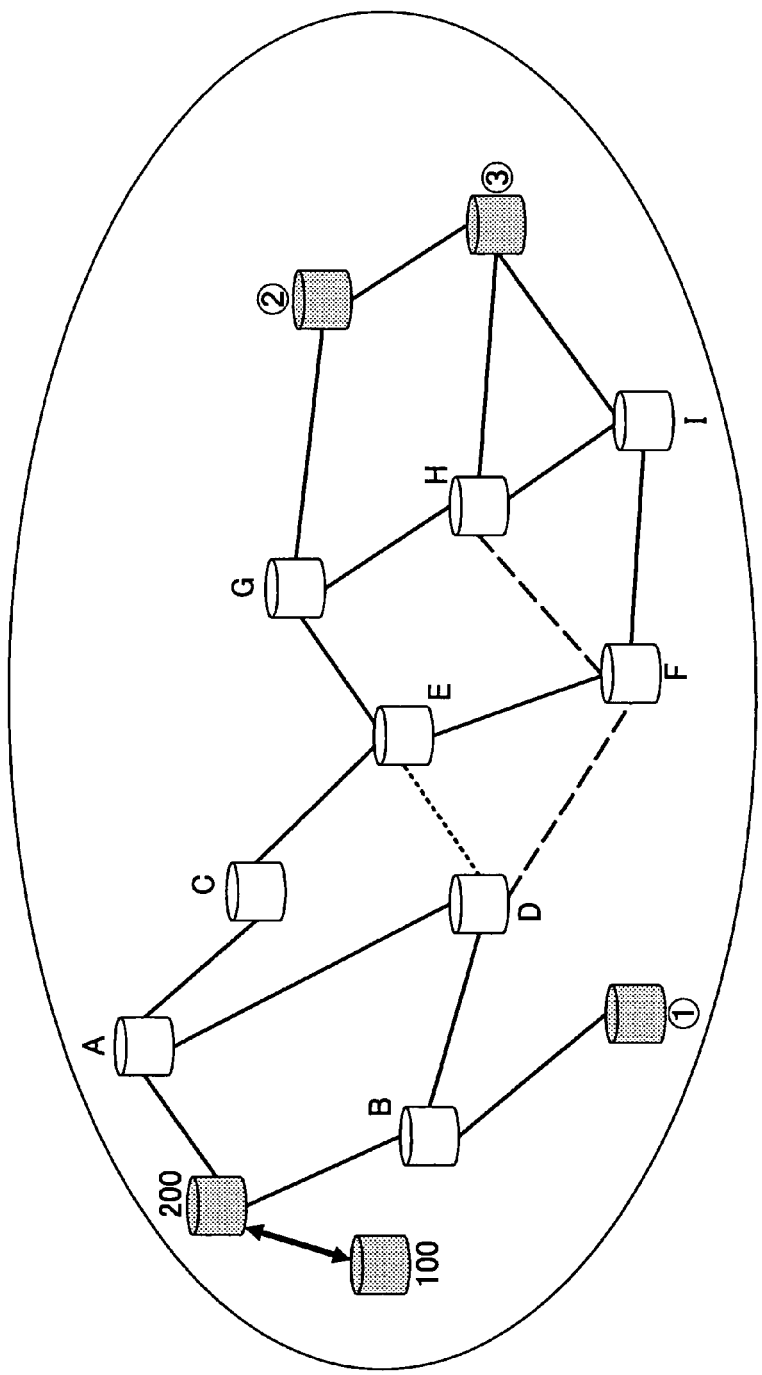
FIG. 7 is a network diagram showing a multicast network according to an embodiment.

FIG. 7 is a network diagram showing an embodiment of the present invention.

In FIG. 7, 200 denotes the starting point from which data are transferred, and (1), (2), and (3) denote the ending points to which the data are transferred. A through I denote intermediate nodes between the starting point and the ending points, and function as the multicast transfer apparatuses 300. The multicast network includes the multicast transfer route setting apparatus 200, the nodes A-I, and the ending points (1)-(3) connected by communication cable (links). Each link has two properties, delay and cost. The delay property and cost property of a link may depend on the direction in which data are transmitted. In the case of FIG. 7, there is a link E-D of which, when data are transferred to the right direction (from D to E), the delay property is 1, and the cost property is 10, whereas when data are transferred to the left direction (from E to D), both the delay property and the cost property are 1. As the starting point, the multicast transfer route setting apparatus 200 transfers data to the ending points (1)-(3) based on the result of computation by the multicast transfer route computing apparatus 100.

Each node collects the network measurement information indicating the delay caused by the links using the above OSPF-TE. The network measurement information is informed to the multicast transfer route computing apparatus 100 in advance.

An example is shown in which the multicast transfer route setting apparatus 200 computes a route of which the upper limit of the delay is 7.

Figure 8:
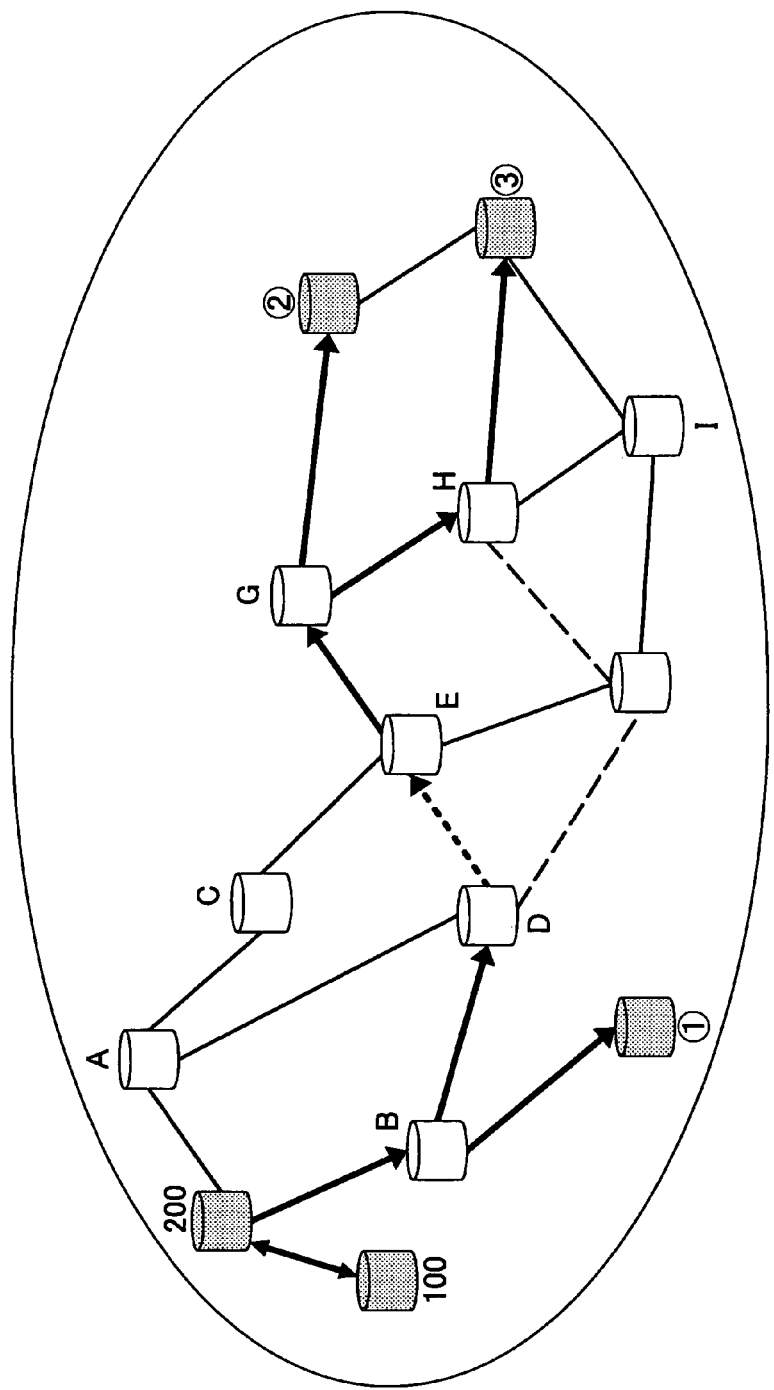
FIG. 8 is a network diagram showing the least delay route in routes connecting a starting point and ending points of data transmission according to an embodiment.

FIG. 8 shows the least delay routes from the starting point to the respective ending points.

In response to receipt of the request for computing the transfer route from the multicast transfer route setting apparatus 200, the multicast transfer route computing apparatus 100 computes the least delay routes from the multicast transfer route setting apparatus 200, which becomes the starting point, to the respective ending points (1)-(3). The multicast transfer route computing apparatus 100 uses the Dijkstra's algorithm for computing the least delay routes. The Dijkstra's algorithm is well known in the art as an algorithm for computing the least delay route. The least cost routes computed by the multicast transfer route computing apparatus 100 are as follows:

multicast transfer route setting apparatus 200—node B—ending point (1);

multicast transfer route setting apparatus 200—node B—node D—node E—node G—ending point (2); and multicast transfer route setting apparatus 200—node B—node D—node E—node G—node H—ending point (3).

The delay between the starting point and the ending points becomes maximum between the starting point 200 and the ending point (3), and the maximum value is 6. This maximum value satisfies the upper limit condition.

Figure 9:
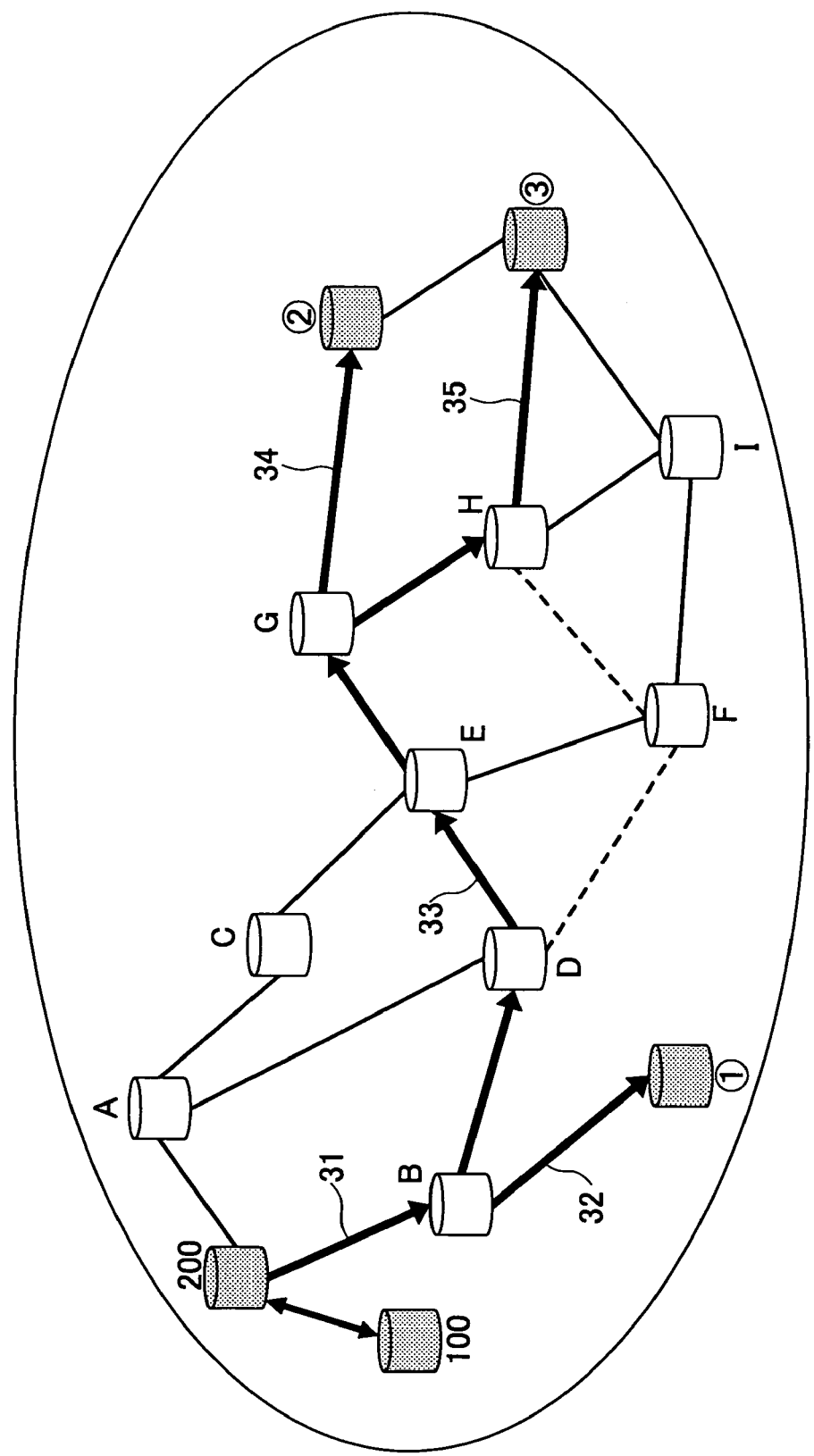
FIG. 9 is a network diagram for explaining the computing of routes to be removed according to an embodiment.

FIG. 9 is a network diagram showing the computation of a route to be removed according to an embodiment.

The least delay route is divided into partial routes, and the partial routes of which ends are either the starting point, the ending point, or a branching point, and that include none of the above points in the middle.

Figure 10:
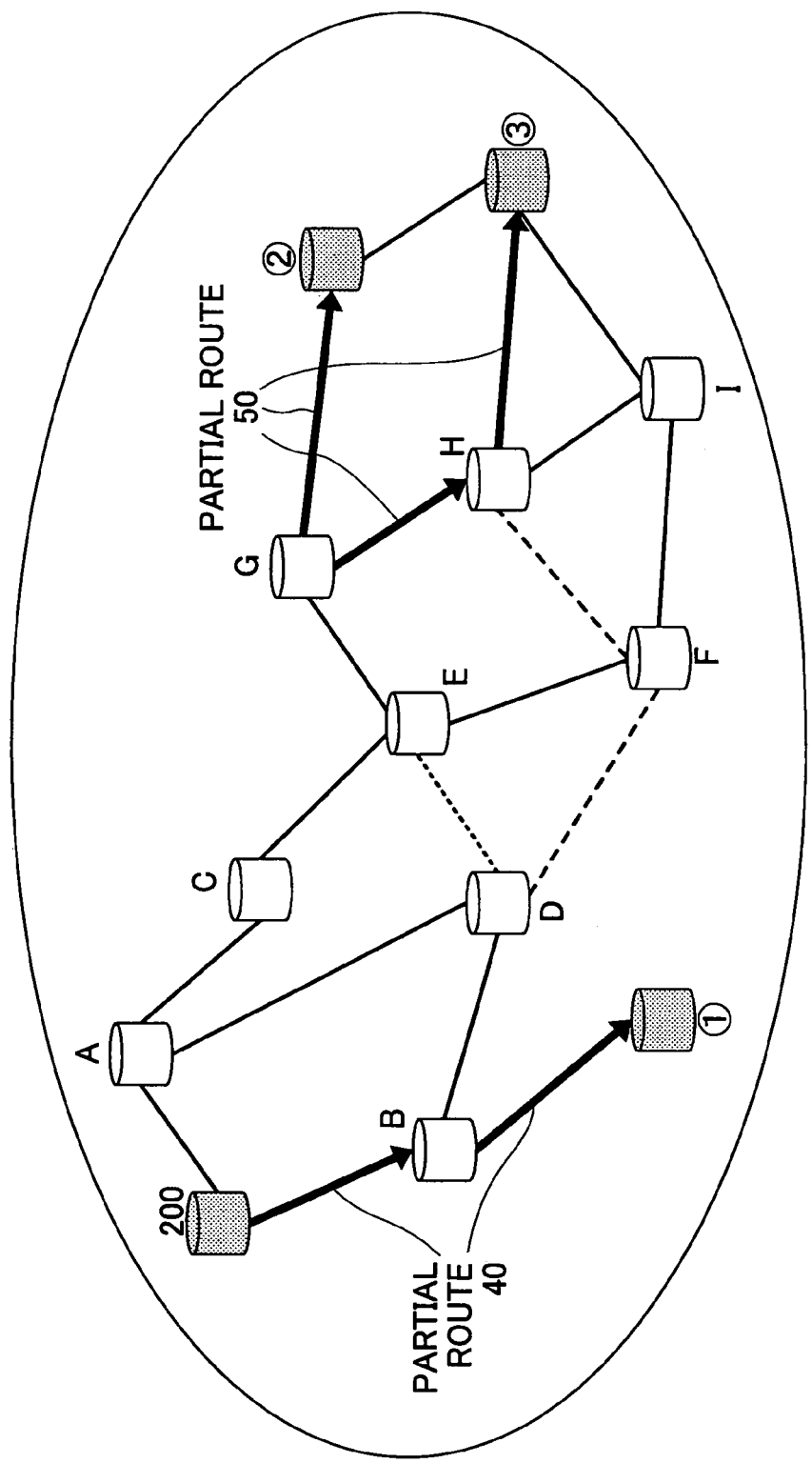
FIG. 10 is a network diagram showing a partial route created after the removing of the greatest-cost route according to an embodiment.

The following partial routes are searched:
Starting point 200—node B (partial route 31);
Node B—ending point (1) (partial route 32);
Node B—node D—node E—node G (partial route 33)
Node G—ending point (2) (partial route 34); and
Node G—node H—ending point (3) (partial route 35). The partial route of which the total cost caused by the links included in the partial route is the greatest is selected. The total cost of "starting point 200—node B" (partial route 31) is 1; the total cost of "node B—ending point (1)" (partial route 32) is 1; the total cost of "node B—node G" (partial route 33) is 12; the total cost of "node G—ending point (2)" (partial route 34) is 1; and the total cost of "node G—ending point (3)" (partial route 35) is 2. Therefore, the partial route "node B—node G" (partial route 33) is selected. FIG. 9 shows the result of search. The selected partial route is removed from the least delay route. As a result, the least cost route is divided into two portions. The partial route including the starting point 200 is denoted as 40, and that not including the starting point 200 is denoted as 50. The least cost route from which the selected partial route has been removed is shown in FIG. 10.

Subsequently, a complementary route that connects the two partial routes 40 and 50 is searched. The complementary route is a route that starts with one of the points included in the partial route 40, ends with the ending point of the removed partial route (the starting point of the partial route 50), does not intersect the partial route 50, and of which total cost is the least. The method of computation is described below.

Figure 11:
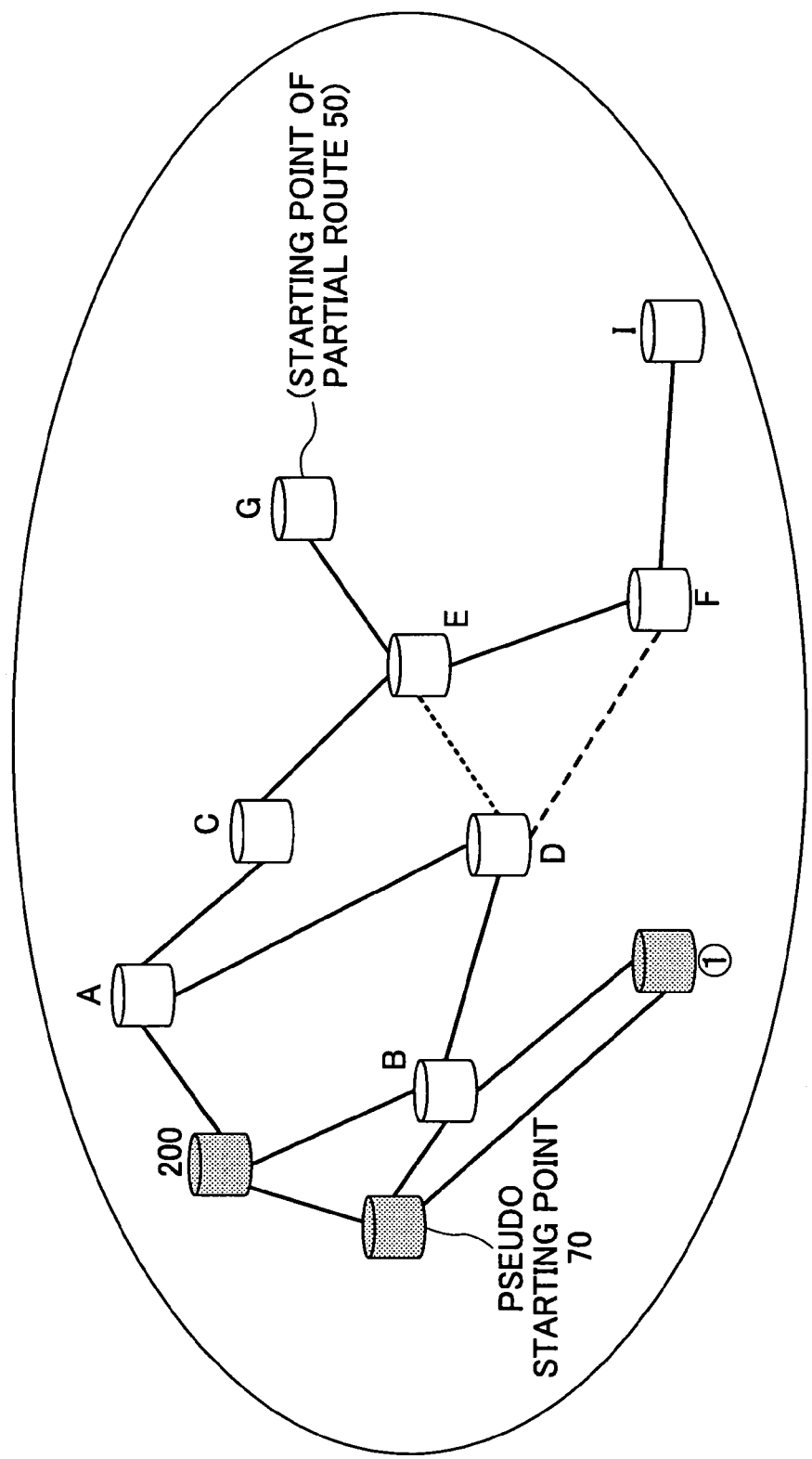
FIG. 11 is a network diagram showing topology for computing complementary routes according to an embodiment.

The network topology used for the computation is different from that of the network for which the complementary route is computed as follows. A pseudo starting point 70 is provided, and links from the pseudo starting point 70 to all nodes included in the partial route 40 are added. Subsequently, the links and nodes (excluding the starting point G of the partial route 50) included in the partial route 50 and the other links connected to the nodes are removed. As a result, the network topology becomes as shown in FIG. 11.

A route connecting the pseudo starting point 70 and the starting point G of the partial route 50 is computed using the k-th shortest path algorithm. The k-th shortest path algorithm is an algorithm for searching the k-th shortest path, which has been proposed and is known in the art. The k-th shortest path algorithm may be applied to the properties such as the delay and cost.

In the case of the delay property, the k-th shortest path algorithm is recursively applied while the delay is below the upper limit. That is, after computing the "k−1"-st shortest path, using the result of the previous computation, the k-th shortest path is computed. The partial route of which the total cost property is the least is selected as the complementary route.

Figure 12:
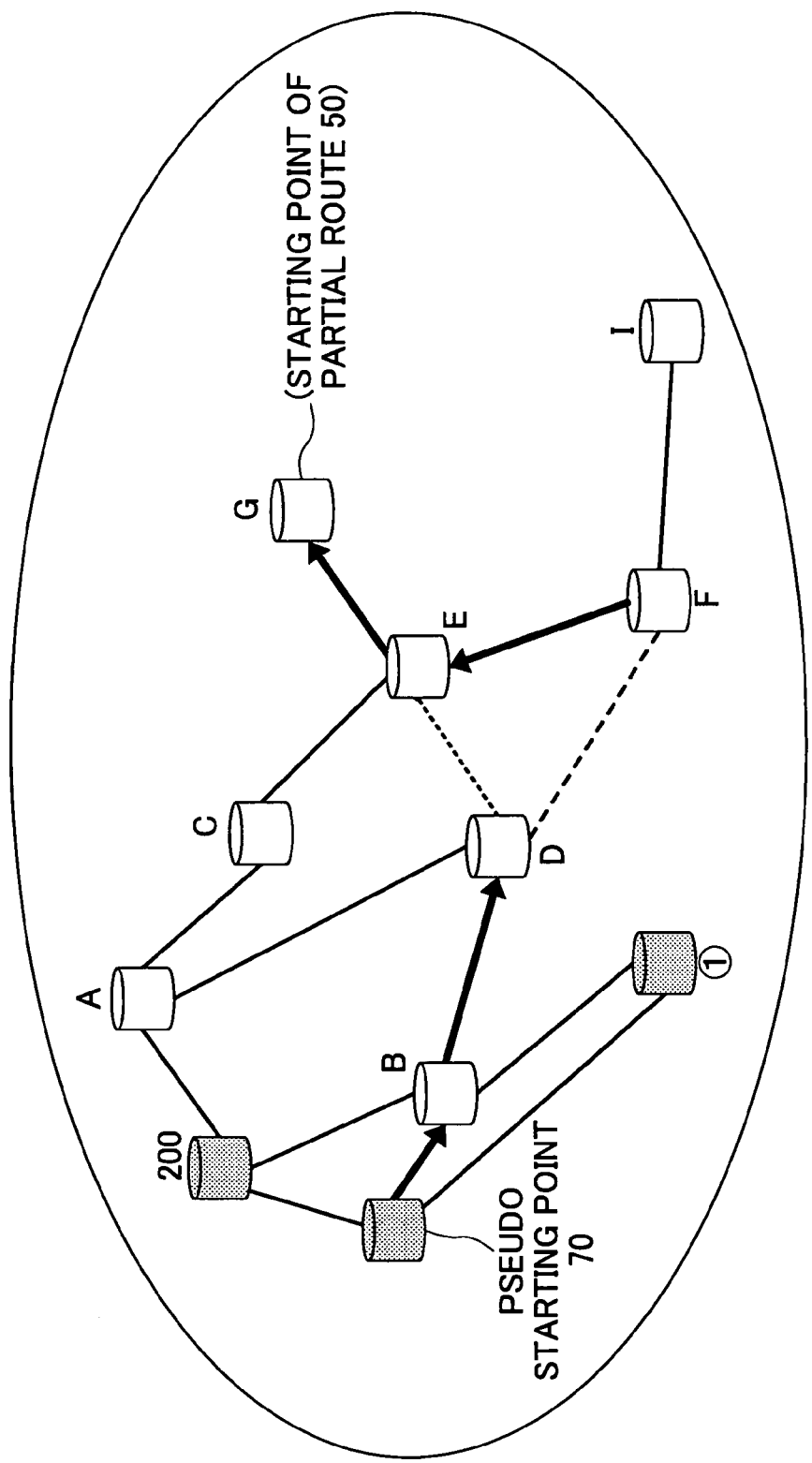
FIG. 12 is a network diagram showing the result of complementary route computation according to an embodiment.

In the case in which the cost property is computed, when the cost incurred between the starting point and the ending point exceeds the upper limit for the first time, the computation of the route with the k-th least cost is terminated. The route computed at that time except for the pseudo starting point 70 is selected as the complementary route. FIG. 12 shows the result of the computation. The route connecting the pseudo starting point 70 and the node G, which is the starting point of the partial route 50, with the least cost is: pseudo starting point 70—node B—node D—node F—node E—node G. Therefore, since the pseudo starting point 70 is excluded, the following route is selected as the complementary route: node B—node D—node F—node E —node G.

The delay incurred between the node G, which is the starting point G of the partial route 50, and the ending points located in the downstream side of the node G is used for the comparison with the upper limit of delay. According to the conventional technique, when the complementary route is computed, the topology of the partial route 50 changes. As a result, after the partial route 50 is re-computed, the delay incurred between the new starting point of the partial route 50 and the ending points needs to be computed. According to the present invention, this step is omitted, and thus the computation time can be reduced. The maximum delay is evaluated, and the maximum delay incurred by the route to which the complementary route is connected between the starting point and the ending points is found to be 7 that is incurred on the route connecting the starting point 200 and the ending point (3). The tolerable upper limit of delay is 7, which is satisfied in this case. The route that satisfies the above delay condition is selected as the complementary route, which is used to connect the partial route 40 and the partial route 50.

Figure 13:
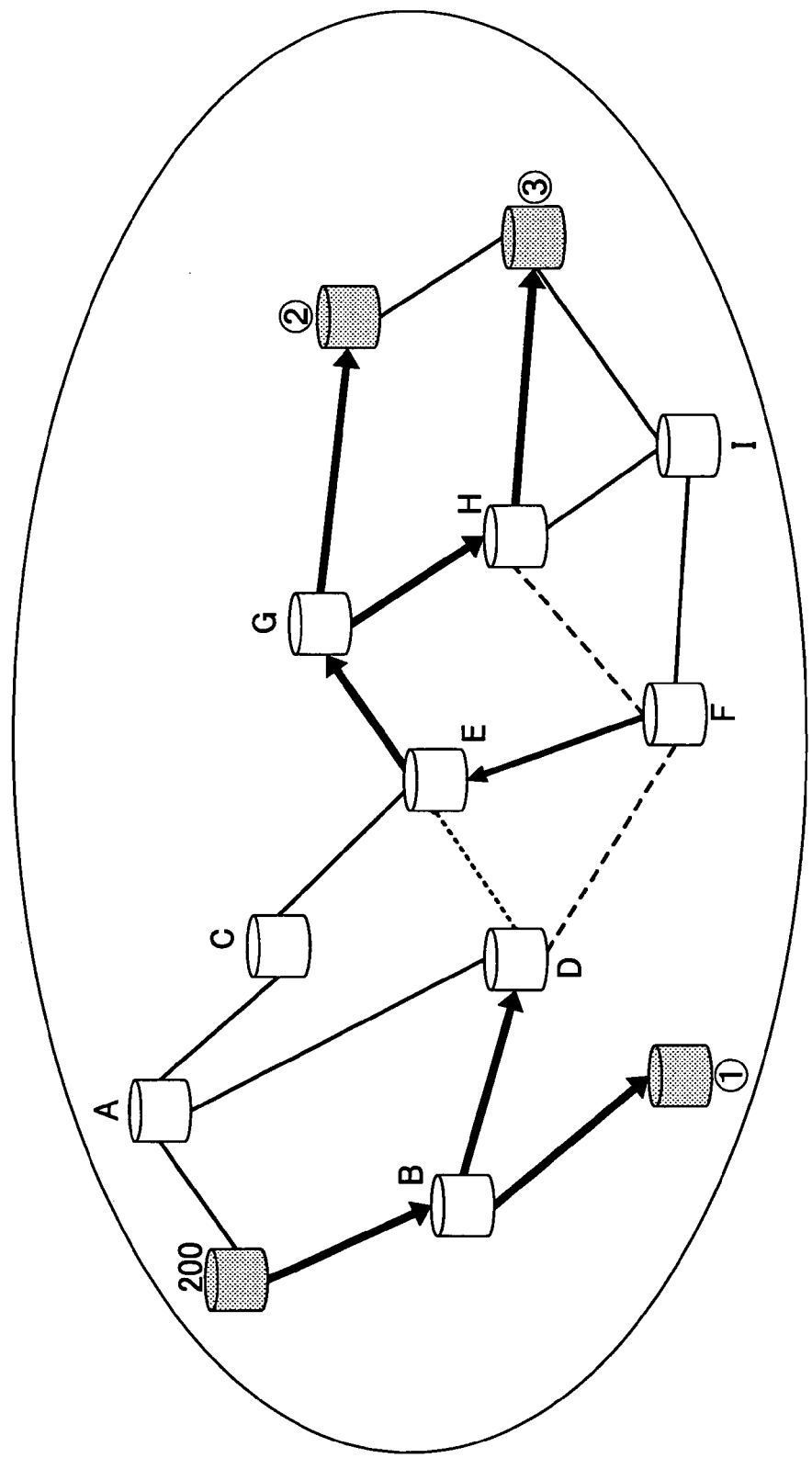
FIG. 13 is a network diagram showing the result of route computation according to an embodiment.

A condition that terminates the algorithm is described below. If the complementary route is the same as the removed route, or the delay of the complementary route is greater than that of the removed route, the removed route is selected as the complementary route, and then the algorithm terminates. If the complementary route is not the same as the removed route, the complementary route is marked, and the following route is selected, and removed: a route (i) of which both ends are either the starting point, the ending points, or the branching points, (ii) that include none of the starting point, the ending points, and the branching points in the middle, and (iii) of which cost is the greatest besides the marked route. Then, the complementary route is searched. The above step is repeated until all the routes are marked. As a result, the computation result shown in FIG. 13 is obtained.

The multicast transfer route computing apparatus and the multicast transfer route setting apparatus described above may be provided with computer systems therein. The above steps may be stored in a computer readable recording medium in the form of computer programs. When the computer reads and executes the computer program, the above steps are performed. Examples of the computer readable recording medium are: a magnetic disk, a magneto-optical disk, a CD-ROM, a DVD-ROM, and a semiconductor memory. The computer program may be delivered to a computer via a communication channel, and the computer that receives the computer program may execute the computer program. In addition, the computer program may be stored in a hard disk or a removable recording medium such as a flexible disk or a CD-ROM that are connected to the computer that operates as the multicast transfer route computing apparatus, and the computer program may be installed into a CPU when the present invention is embodied.

As described above, according to the present invention, a system has a node to which an algorithm for computing the route is provided, taking into consideration the upper limit of delay incurred between the starting point and the ending points. According to the above arrangement, the system can provide application in which there is an upper limit in delay incurred between the starting point and the ending points in a multicast communication satisfying the delay condition but reducing the cost of the entire route.

Since the method according to the present invention requires shorter time for computing the route than the conventional method, the method according to the present invention can reduce time required for providing the service. According to this arrangement, the user can be provided with the service quickly.

The multicast distribution (transfer) in accordance with the multicast communication route setting technique can be realized by a network using a multicast label switching method. A preferred embodiment of the multicast label switching method according to the present invention is described below with reference to the drawings.

A method of setting a communication route using the multicast label switching and a mechanism for transferring packets are described first.

Figure 14:
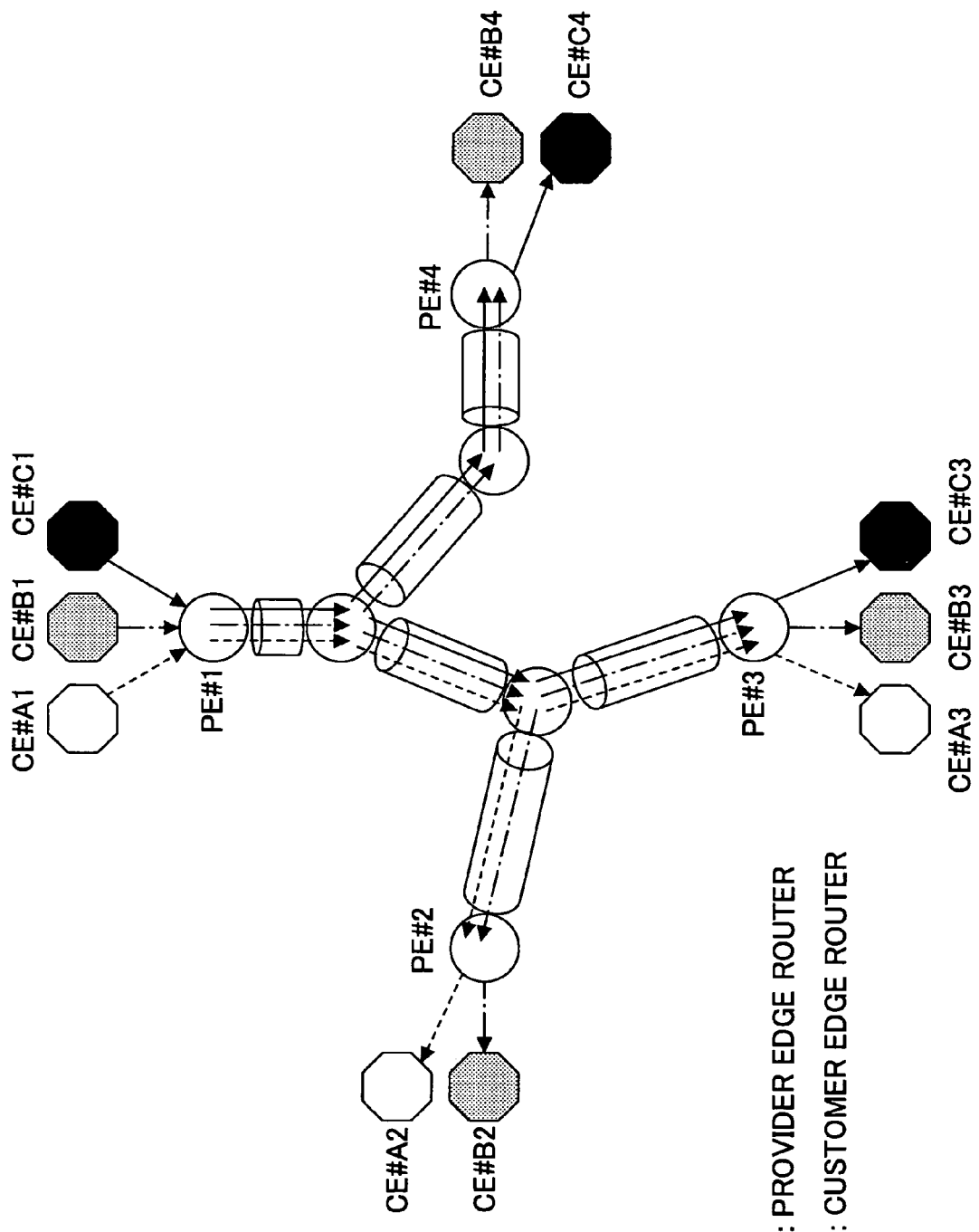
FIG. 14 is a schematic diagram showing an optimal inter-PE router multicast distribution pattern in which a connection VPN site (CE) is taken into consideration according to a first embodiment.

FIG. 14 shows the pattern of optimum multicast distribution between provider edge (PE) routers in which connection VPN sites (CE) according to an embodiment of the present invention are taken into consideration. The exemplary provider network shown in FIG. 14 is provided with provider edge routers PE#1, PE#2, PE#3, and PE#4, and provider (P) routers connecting the PE routers.

PE#1 accommodates CE#A1 belonging to VPN#A, CE#B1 belonging to VPN#B, and CE#C1 belonging to VPN#C. PE#2 accommodates CE#A2 belonging to VPN#A and CD#B2 belonging to VPN#B. PE#3 accommodates CE#A3 belonging to VPN#A, CE#B3 belonging to VPN#B, and CE#C3 belonging to VPN#C. PE#4 accommodates CE#B4 belonging to VPN#B and CE#C4 belonging to VPN#C.

The optimum distribution pattern of multicast traffic transmitted from the PE#1 to the other PE routers is considered. From the standpoint of the provider network, it is not desired to set plural multicast label switching between the PE routers from the viewpoint of the efficient use of label and transfer resources. To solve this problem, point-to-multi point label switched paths (LSP) that are commonly used by all traffics are set from PE#1 to PEs #2, 3, and 4.

Paths indicated as pipes shown in FIG. 14 correspond to LSPs. In this example, we need multicast sub-label switching paths that interconnect only appropriate sites of a given VPN between PEs to accommodate each VPN in a multicast label switching path. For example, in the example shown in FIG. 14, since the sites of VPN#A are accommodated under PE#2 and PE#3, it is desired to set multicast sub-label switching routes in which PE#1 is a source and PE#2 and #3 are leafs. The multicast distribution route indicated by the arrows of the dotted line correspond to this multicast sub-label switching route. Similarly, the arrows of the short and long dash line correspond to VPN#B, and the arrows of the solid line correspond to VPN#C.

As will be appreciated from this example, it is effective to set double layered point-to-multipoint label switching path for the efficient use of provider network and the optimum multicast distribution between the PE routers depending on the accommodating VPN sites. It is noted that the second layer of the label switching path is a subset of the first layer of the label switching path.

Figure 15:
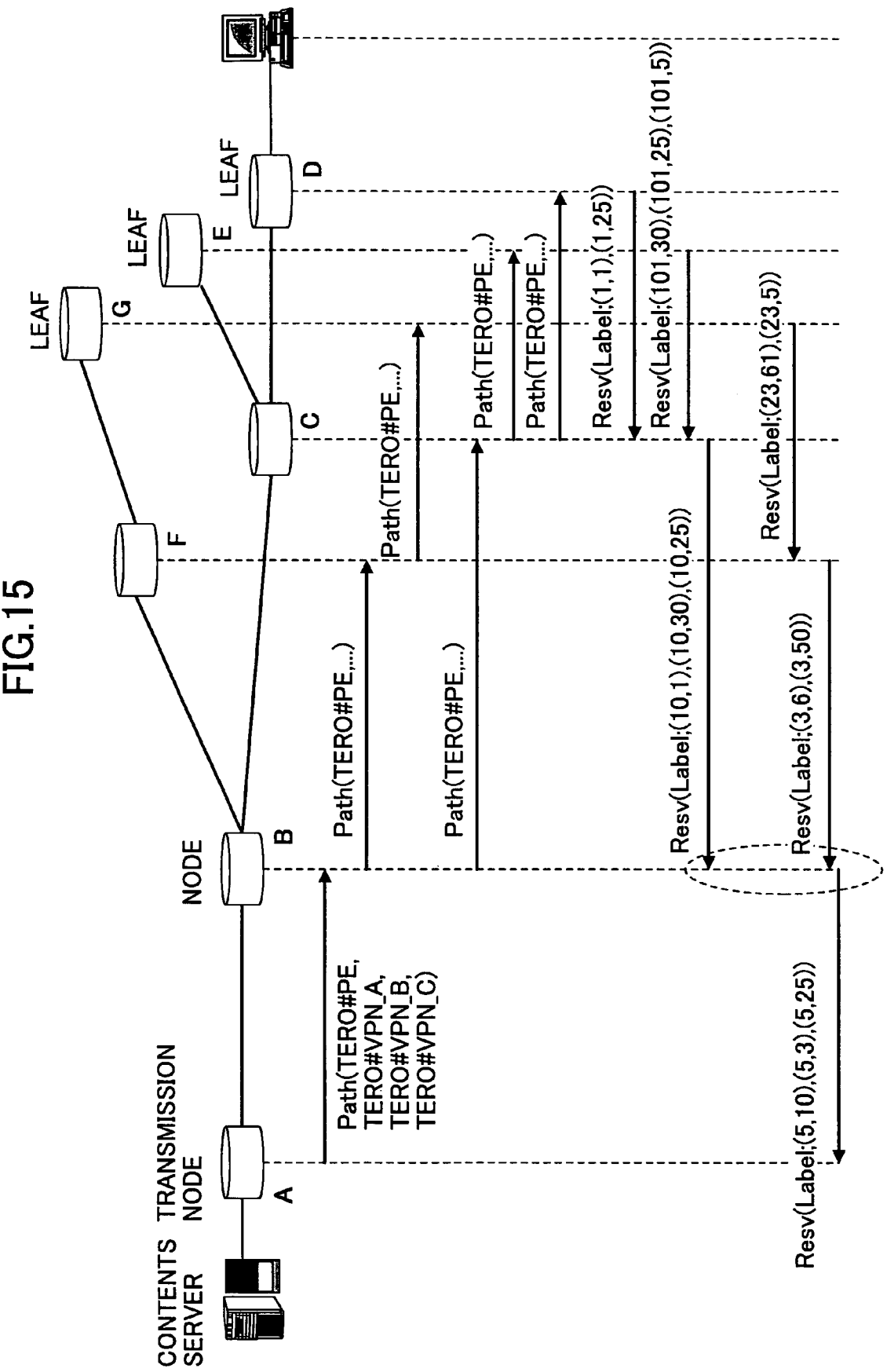
FIG. 15 is a schematic diagram showing an optimal inter-PE router multicast distribution pattern in which the connection VPN (CE) site is taken into consideration according to the first embodiment.
Figure 16:
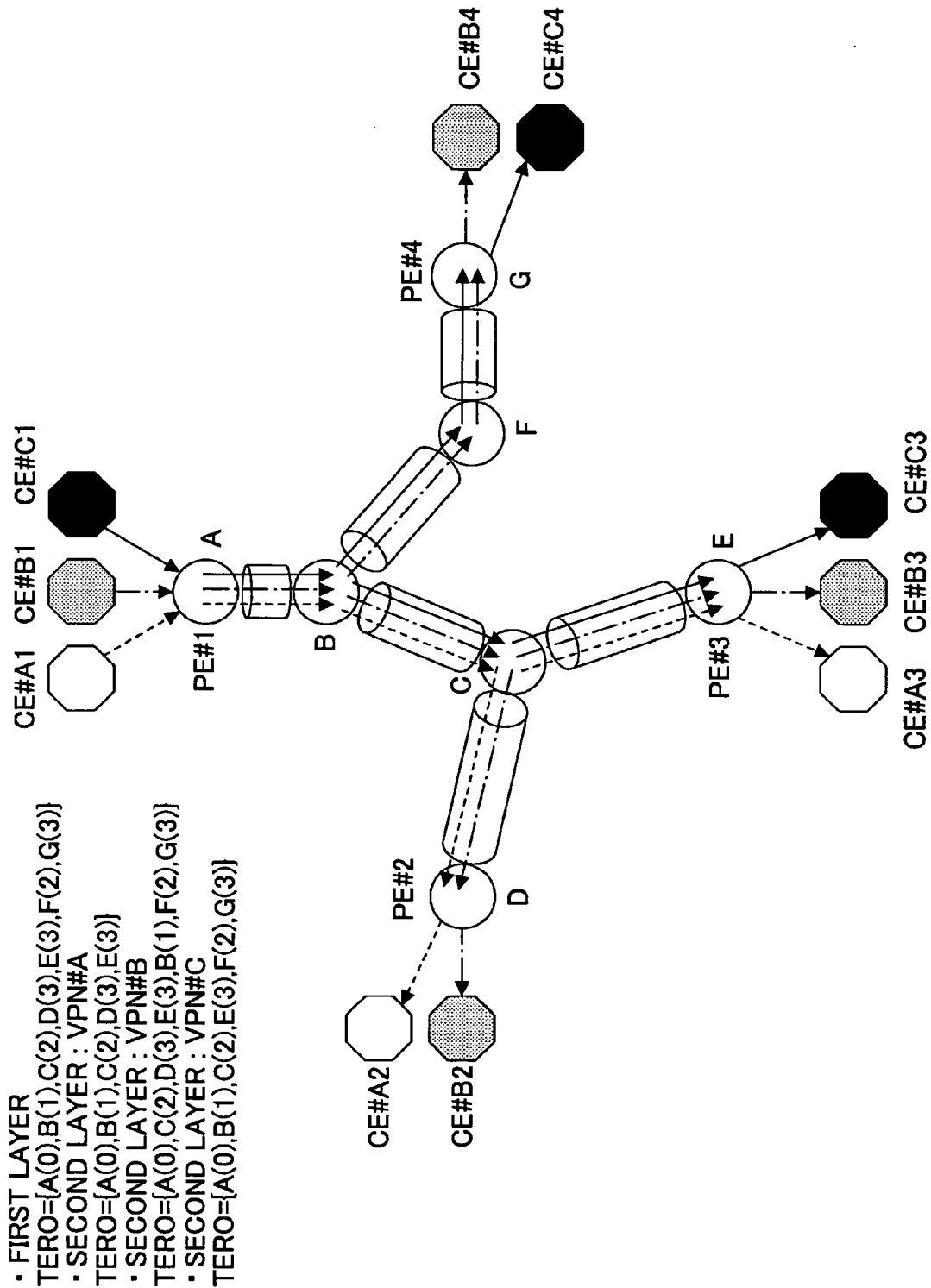
FIG. 16 is a schematic diagram showing hierarchical tree designation signaling that realizes the optimal inter-PE router multicast distribution connection in which the connection VPN site (CE) is taken into consideration according to the first embodiment.

FIG. 15 shows a signaling mechanism for setting multicast label switching path shown in FIG. 14. The multicast label signaling is set by extending the conventional RSVP-TE (Resource Reservation Protocol-Traffic Engineering) mechanism into multicast. As shown in FIG. 15, the multicast distribution circuit to be set is defined by TERO (Tree Explicit Route Object) of path message. A specific format is shown in FIG. 16 corresponding to the network topology.

As described above, according to the present invention, double layered multicast label switching paths are set for setting the optimum multicast distribution routes between the PE routers. Thus, TERO indicating the set routes of the multicast label switching path is prepared for the two layers. In the example shown in FIG. 16, multicast label switching routes connecting the first layer of PE#1 (A) to PE#2 (D), PE#3 (E), and PE#4 (G) are defined. The TERO is defined as [A(0), B(1), C(2), D(3), E(3), F(2), G(3)]. This definition is based on a Depth First Order algorithm. Numerals in parenthesis associated with each node indicate the distances (the number of hops) from the source node PE#1 (A).

Figure 17:
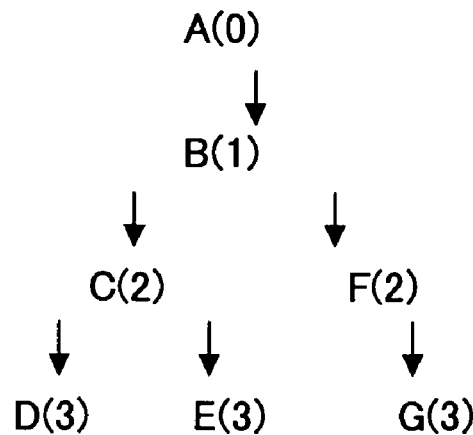
FIG. 17 is a schematic diagram showing a multicast distribution route according to the first embodiment.
Figure 18:
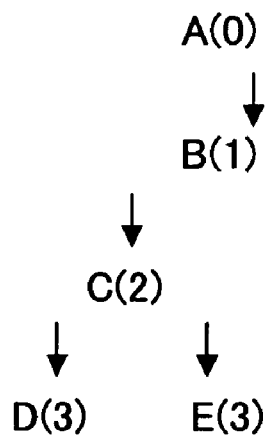
FIG. 18 is a schematic diagram showing the sub-tree of the VPN#A according to the first embodiment.

The example shown in FIG. 15 is the multicast distribution routes of which connection is configured as shown in FIG. 17. Since the Depth First Order algorithm designates the path in the direction of depth at first, the TERO is designated as [A(0), B(1), C(2), D(3), E(3), F(2), G(3)]. Additionally, a multicast LSP is set for each VPN under the first layer of the multicast LSP. The sub-tree of VPN#A is from PE#1 (A) to PE#2 (D) and PE#3 (E) and configured as shown in FIG. 18, the TERO of the second layer of VPN#A is: TERO=[A(0), B(1), C(2), D(3), E(3)]. The TERO of the second layer of VPN#C is: TERO=[A(0), B(1), C(2), E(3), F(2), G(3)].

As shown in FIG. 15, the Path message is transferred to leaf nodes in accordance with TERO information. In response to the transfer of the path message to the leaf nodes, layered labels are assigned by Resv message from downstream.

Figure 19:
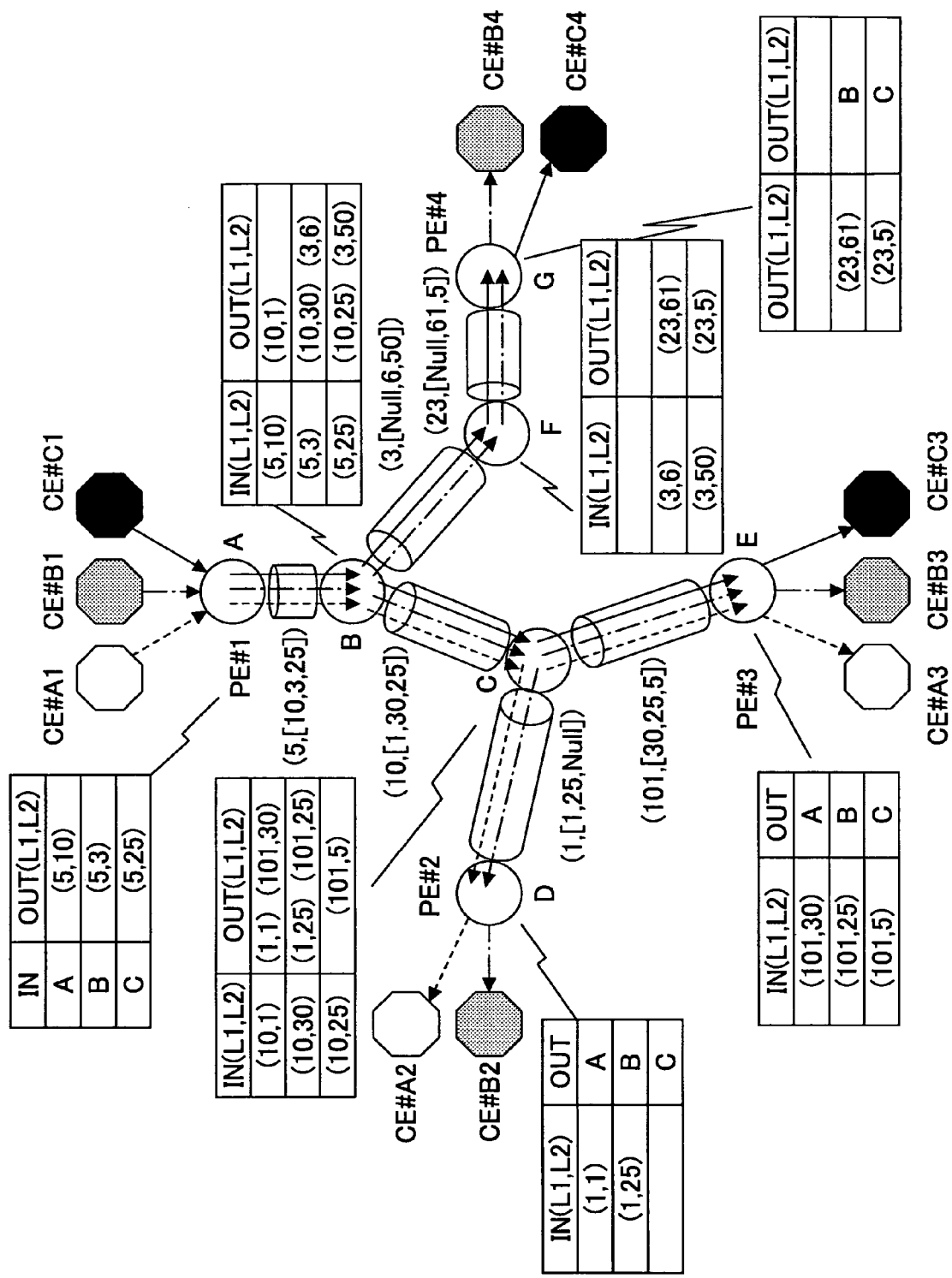
FIG. 19 is a schematic diagram showing MPLS label exchange tables designated in the hierarchical tree designation signaling that realizes the optimal inter-PE router multicast distribution connection according to the first embodiment.

FIG. 19 shows label conversion tables set to respective nodes by the above operation and hierarchical labels used by the respective links. For example, because the TERO of the second layer including the VPN#A, B, and C arrive at the node PE#3 (E), the labels A(101, 30), B(101, 25), and C(101, 5) are assigned to respective VPNs.

Additionally, only the second layer TERO including VPN#A, B arrives at PE#2. Therefore, 2 stack labels A(1, 1), B(1, 25), and C(1, null) are assigned for VPN#A, VPN#B, and VPN#C at link CD. The stacked labels information is transferred to node C by Resv message and label swapping relationship between input link BC and output links CD and CE are set on MPLS forwarding table at node C. It is noted that no label for VPN#C is assigned at CD link and only a label (101, 5) for VPN#C is assigned at CE link in the forwarding table.

In the case of VPN#A, B, label packets coming from the BC link have their labels converted and distributed to the CD and CE links. However, in the case of VPN#C, label packets are not transferred to the CD link, which is label switched only to the CD link. This operation continues up to the transmission node A hop by hop, and the hierarchical label switching route for each VPN is formed. According to the above arrangement, packets of each VPN input to the node A have hierarchical labels assigned, are label-switched in accordance with the hierarchical labels at relay nodes, and are multicast-distributed to the leaf nodes.

However, the multicast traffic in the VPN cannot be distributed through multicast routes in the optimum manner.

Figure 20:
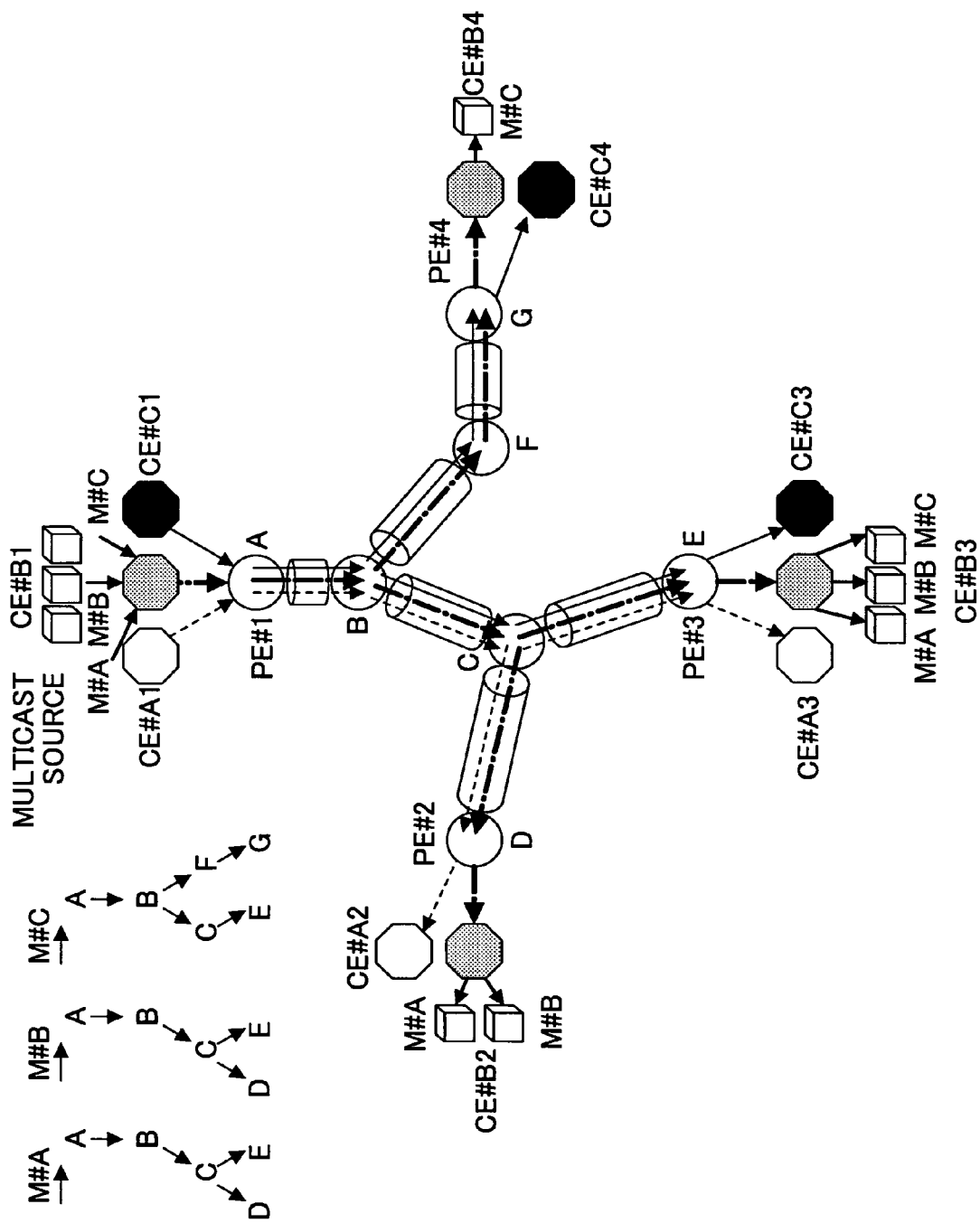
FIG. 20 is a schematic diagram showing a method of setting the optimal multicast distribution route in which the distribution pattern of the multicast source in the site according to the first embodiment.

FIG. 20 shows the case in which there are multicast source M#A, M#B, and M#C in the VPN#B under the PE#1, the distribution patterns (shown in the upper left portion of FIG. 20) of which are different from each other. In this case, if the label switch routes are double layered, M#A, M#B, and M#C are distributed to all PE routers PE#2, PE#3, and PE#4 in which VPN#B is accommodated. The efficiency of the network becomes not high. For example, M#A is multicast-distributed to PE#4 that does not receive it.

To avoid such useless multicast distribution, it is possible to further assign the third layer label. According to this example, this label corresponds to a multicast source group having the same distribution topology in the same VPN site.

Any distribution pattern can be realized by using such a heuristic stratifying mechanism.

The VPN multicast switching to which the multicast label switching according to the above embodiment is provided is described below.

The three layered label switching technique described in the above embodiment is effective for distributing the multicast traffic in the VPN via the optimum topology.

Figure 21:
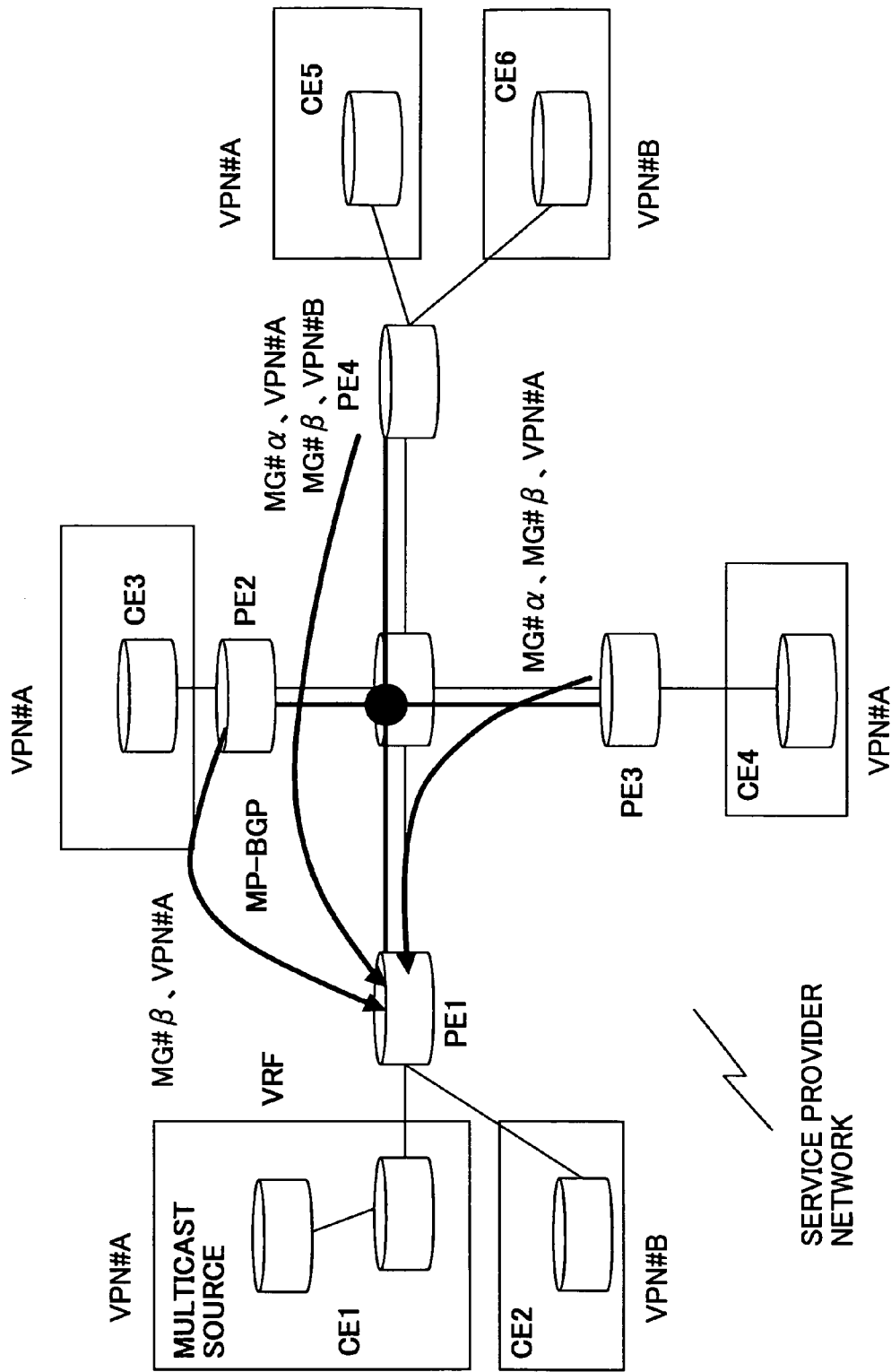
FIG. 21 is a schematic diagram for explaining mechanism for exchanging multicast distribution routes between PEs according to the first embodiment.

In order to connect the VPN sites in a closed manner using the mechanism according to the above embodiment, the information of multicast distribution routes accommodated in each VPN needs to be exchanged between the PE routers in the same manner as the ordinary unicast route exchange. An example is shown in FIG. 21. As shown in FIG. 21, the information can be exchanged in accordance with MP-BGP defined as rfc2547bis. FIG. 21 shows an example in which the PE routers other than PE1 distributes to PE1 the multicast distribution routes in the VPN sites accommodated in the PE routers.

For example, because PE#4 accommodates VPN#A and B, PE#4 distributes the multicast route MG#α of VPN#A and the multicast route MG#β of VPN#B to PE1 using the MP-BGP. According to this example, one directional exchange of the routes is shown. However, the bi-directional full-mesh exchange of routes among PE routers allows each PE router to have the information about all the multicast routes in the VPN sites accommodated by opposing PE routers.

Figure 22:
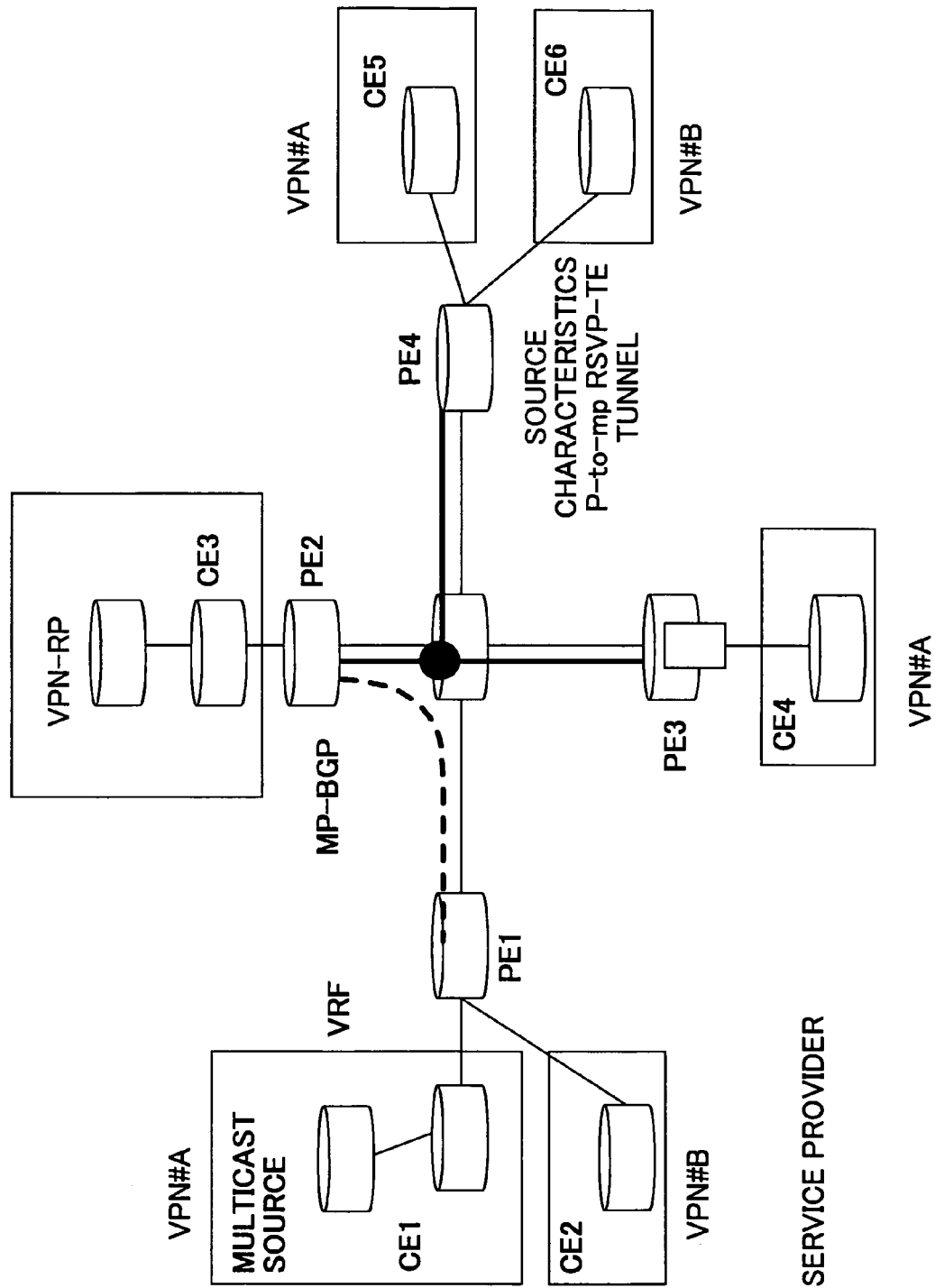
FIG. 22 is a schematic diagram showing a VPN model to which the present invention is applied.
Figure 23:
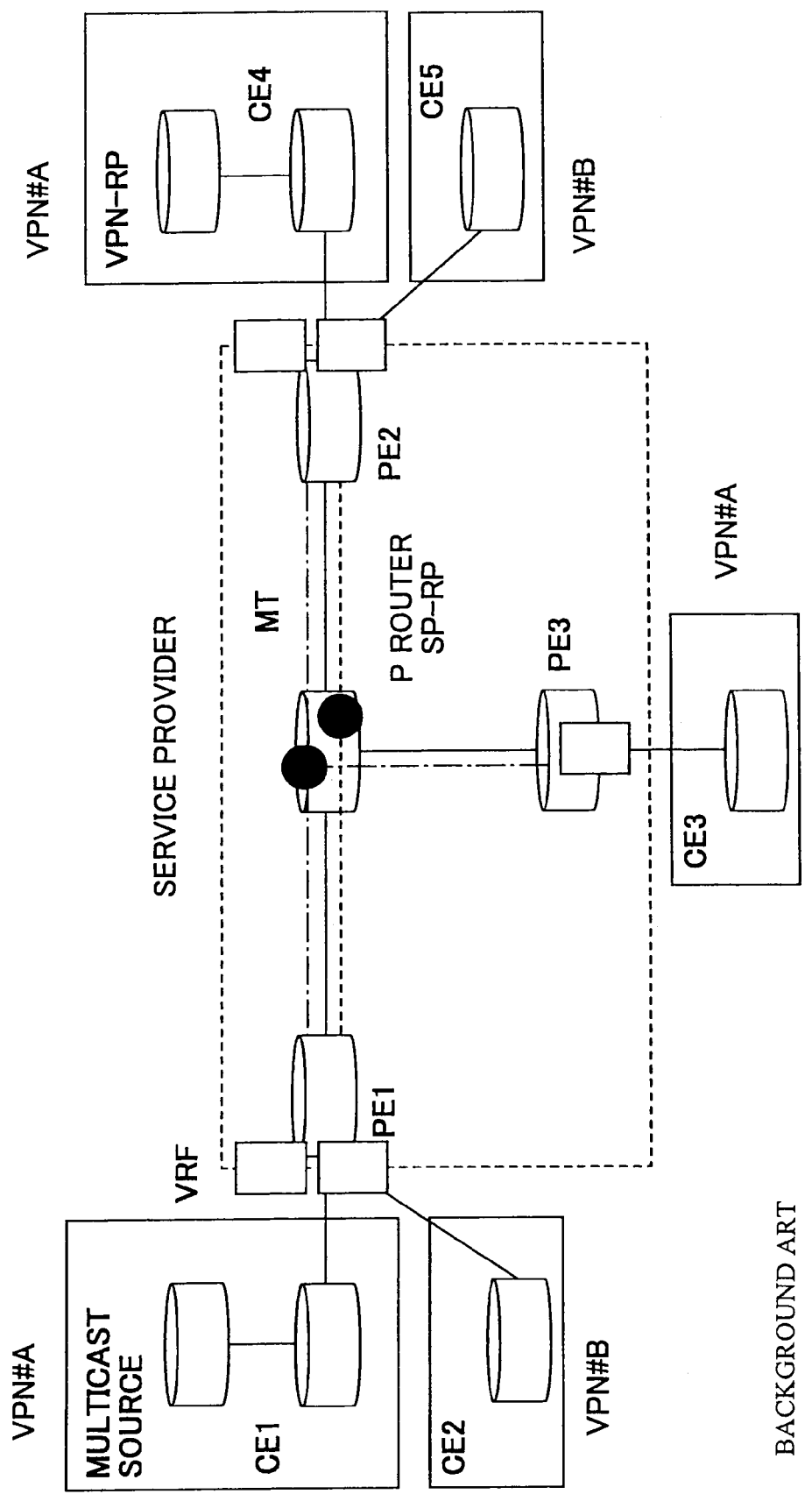
FIG. 23 is a schematic diagram showing a VPN model (Rosen) according to the prior art.
Figure 24:
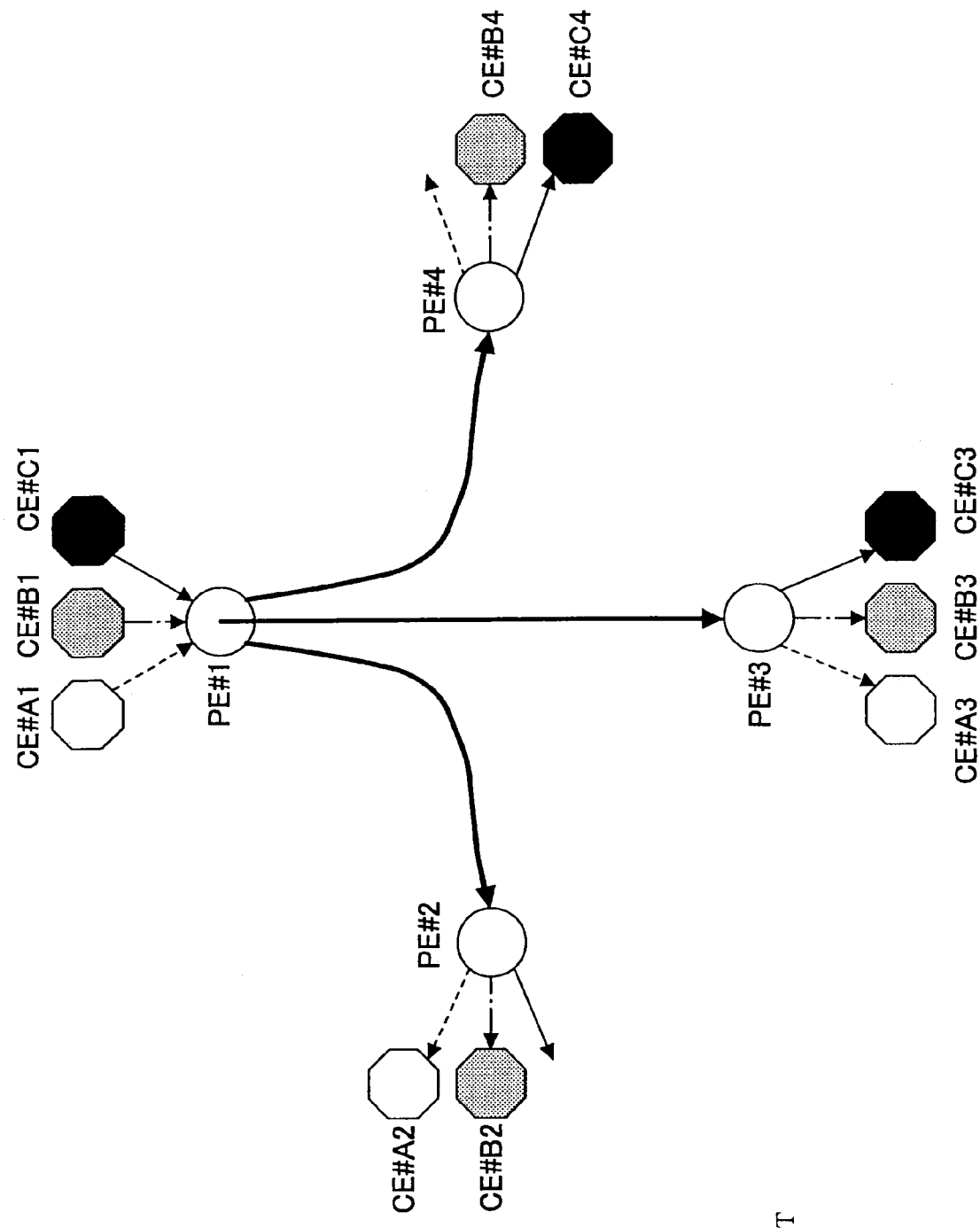
FIG. 24 is a schematic diagram showing the conventional multicast connection between the PE routers and the multicast distribution pattern to the CEs in the VPN site.

According to the above arrangements, the transmission node that sets the multicast label switching routes can set the hierarchical point-to-multipoint LSP in which the multicast routes of opposing PEs are taken into account. FIG. 22 shows a VPN model to which the present invention is applied. The application of this model makes the multicast of PIM-SM of VPN site animation possible to be VPN-transferred.

As described above, according to a method of multicast label switching and a method of VPN multicast label switching of the present invention, it is possible to build a multicast transfer network and a VPN network that can multicast-distribute using the topology suitable for the destination receiving group and at the same time to prevent the transfer cost of the entire multicast distribution routes.

As a result, the multicast distribution network becomes efficient and of high performance.

The present invention is not limited to the specifically disclosed embodiments, and variations and modifications may be made without departing from the scope of the present invention.

The invention claimed is:

1. A method of setting multicast transfer routes in a multicast network comprising a plurality of points, the multicast transfer routes connecting a given starting point and a plurality of ending points, the multicast network comprising a multicast transfer apparatus provided to each point, a multicast transfer route computing apparatus that computes the multicast transfer routes, and a multicast transfer route setting apparatus that sets the computed multicast transfer routes, the method comprising the following steps:

the multicast transfer apparatus measures a traffic state of each direction in which data flow through each link of the network and requests the multicast transfer route computing apparatus to compute multicast transfer routes by transmitting the measured traffic state;

the multicast transfer route computing apparatus computes a shortest route with respect to delay connecting the starting point and the ending points based on the measured traffic state, computes delay from each point on the shortest route at the same time, and stores the computed delay in a recording medium;

the multicast transfer route computing apparatus computes a greatest delay in the data flow through the computed shortest route;

the multicast transfer route computing apparatus compares the greatest delay with a predefined delay condition, re-defines the delay condition if the greatest delay does not satisfy the delay condition, searches, if a condition that the shortest route satisfies is found, a partial route in the computed shortest route that has two of the same kind or different kinds of the starting point, the ending points, and branching points, as ending nodes of the partial route, that has none of the starting point, the ending points, and branching points in the middle, and that incurs the greatest cost, removes the searched partial route from the computed shortest route thereby to divide the multicast transfer route into two route trees, and sets a route computed separately as a complementary route that complements the removed route to connect the two route trees;

the multicast transfer route computing apparatus informs the multicast transfer route setting apparatus of the result of computation; and the multicast transfer route setting apparatus sets the multicast transfer route in accordance with the informed result of computation.

2. The method as claimed in claim 1,
wherein
when computing the complementary route, the multicast transfer route computing apparatus computes a route that incurs delay between the starting point and the ending points, that is less than an upper limit, and that incurs the least cost.

3. The method as claimed in claim 2,
wherein
when computing the complementary route, the multicast transfer route computing apparatus selects the starting point of the complementary route to be computed from nodes in the route tree that include the starting point, and computes a route of which ending point is the ending point of the removed route.

4. The method as claimed in claim 3,
wherein
when computing the complementary route, the multicast transfer route computing apparatus applies a known k-th shortest path algorithm to delay, and repeats the applying of the k-th shortest path algorithm while the delay condition is satisfied.

5. The method as claimed in claim 4,
wherein
when computing the complementary route, the multicast transfer route computing apparatus applies the known k-th shortest path algorithm to cost, and repeats the applying of the k-th shortest path algorithm until a route that satisfies the delay condition is found.

6. The method as claimed in claim 4,
wherein
when computing the complementary route, the multicast transfer route computing apparatus uses the delay from the starting point of the multicast transfer route to the starting point of the complementary route stored in the recording medium when the shortest route is computed, and the delay from the ending point of the complementary route to each of the ending points of the multicast transfer route in order to determine whether the result of computation satisfies the delay condition.

7. An apparatus for computing a multicast transfer route in a multicast network, comprising:

a measurement result receiving unit that receives the result of measurement of traffic state in the multicast network;

a measurement information storing unit that stores the received result of measurement;

a measurement result storing unit that causes the measurement information storing unit to store the result of measurement; and a route computing unit that reads the result of measurement from the measurement information storing unit, and computes the multicast transfer route based on the result of measurement, wherein the route computing unit further comprises:

a shortest route delay computing unit that computes a shortest route with respect to delay connecting the starting point and the ending points based on the measured traffic state, computes delay from each point on the shortest route at the same time, and stores the computed delay in a recording medium;

a maximum delay computing unit that computes a greatest delay in the data flow through the computed shortest route;

a maximum cost route searching unit that compares the greatest delay with a predefined delay condition, re-defines the delay condition if the greatest delay does not satisfy the delay condition, searches, if a condition that the shortest route satisfies is found, a partial route in the computed shortest route that has two of the same kind or different kinds of the starting point, the ending points, and branching points as ending nodes of the partial route, that has none of the starting point, the ending points, and branching points in the middle, and that incurs the greatest cost;

a route tree dividing unit that removes the searched partial route from the computed shortest route thereby to divide the multicast transfer route into two route trees; and a complementary route computing unit that sets a route computed separately as a complementary route that complements the removed route to connect the two route trees.

8. The apparatus as claimed in claim 7,
wherein
the complementary route computing unit computes a route that incurs delay between the starting point and the ending points, that is less than an upper limit, and that incurs the least cost.

9. The apparatus as claimed in claim 8,
wherein
the complementary route computing unit selects the starting point of the complementary route to be computed from nodes in the route tree that includes the starting point, and computes a route of which ending point is the ending point of the removed route.

10. The apparatus as claimed in claim 9, wherein
the complementary route computing unit applies a known k-th shortest path algorithm to delay, and repeats the applying of the k-th shortest path algorithm while the delay condition is satisfied.

11. The apparatus as claimed in claim 10, wherein
the complementary route computing unit applies the known k-th shortest path algorithm to cost, and repeats the applying of the k-th shortest path algorithm until a route that satisfies the delay condition is found.

12. The apparatus as claimed in claim 10, wherein
the complementary route computing unit uses the delay from the starting point of the multicast transfer route to the starting point of the complementary route stored in the recording medium when the shortest route is computed, and the delay from the ending point of the complementary route to each of the ending points of the multicast transfer route in order to determine whether the result of computation satisfies the delay condition.

13. The apparatus as claimed in claim 7, further comprising:
an indicating unit that indicates the result of computation by the route computing unit in a control message for setting the transfer route; and
a transmission unit that transmits the control message through the multicast transfer route indicated by the result of computation.

14. The apparatus as claimed in claim 7, further comprising:
a receiving unit that receives a request for computing the multicast transfer route from a multicast transfer route setting apparatus; and
a transmitting unit that transmits the result of computation to the multicast transfer route setting apparatus.

15. A computer readable recording medium that causes a computer to compute a multicast transfer route based on the result of measurement of traffic state incurred in links in a multicast network, the computer program comprising the steps of:
computing the shortest route with respect to delay connecting the starting point and the ending points based on the measured traffic state;
computing delay from each node on the shortest route at the same time;
storing the computed delay in a recording medium;
computing the greatest delay in data flow through the computed shortest route;
comparing the greatest delay with a predefined delay condition,
re-defining, if the greatest delay does not satisfy the delay condition, the delay condition;
searching, if a condition that the shortest route satisfies is found, a partial route in the computed shortest route that has two of the same kind or different kinds of the starting node, the ending nodes, and branching nodes as ending nodes thereof, that has none of the starting node, the ending nodes, and branching nodes in the middle, and that incurs the greatest cost;
removing the searched partial route from the computed shortest route thereby to divide the multicast transfer route into two route trees;
setting a route computed separately as a complementary route that complements the removed route to connect the two route trees.

16. The computer readable recording medium as claimed in claim 15, wherein
when computing the complementary route, the computer computes a route that incurs delay between the starting node and the ending nodes is less than an upper limit, and that incurs the least cost.

17. The computer readable recording medium as claimed in claim 16, wherein
the computer selects the starting node of the complementary route to be computed from the nodes in the route tree that includes the starting node, and computes a route of which ending node is the ending node of the removed route.

18. The computer readable recording medium as claimed in claim 17, wherein
the computer applies a known k-th shortest path algorithm to the delay, and repeats the application while the delay condition is satisfied.

19. The computer readable recording medium as claimed in claim 18, wherein
the computer applies the known k-th shortest path algorithm to the cost, and repeats the application until a route that satisfies the delay condition is found.

20. The computer readable recording medium as claimed in claim 18, wherein
the computer uses the delay from the starting node to the starting node of the complementary route stored in the recording medium when the shortest route is computed, and the delay from the ending node of the complementary route to the ending nodes in the downstream thereof in order to determine whether the result of computation satisfies the delay condition.

21. A recording medium storing a computer program that causes a computer to compute a multicast transfer route based on the result of measurement of traffic state incurred in links in a multicast network, wherein
the recording medium stores the computer program as claimed in claim 15.

* * * * *